US008223105B2

(12) United States Patent  (10) Patent No.: US 8,223,105 B2
Shiraishi  (45) Date of Patent: Jul. 17, 2012

(54) LCD CONTROLLER AND LCD CONTROL METHOD

(75) Inventor: Naoyuki Shiraishi, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 1099 days.

(21) Appl. No.: 12/153,128

(22) Filed: May 14, 2008

(65) Prior Publication Data

US 2008/0284705 A1    Nov. 20, 2008

(30) Foreign Application Priority Data

May 15, 2007  (JP) ................................. 2007-129871

(51) Int. Cl.
G09G 3/36        (2006.01)
(52) U.S. Cl. ............... 345/98; 345/168; 345/55; 341/22
(58) Field of Classification Search ............ 345/87–104, 345/55, 68; 341/22
See application file for complete search history.

(56) References Cited

U.S. PATENT DOCUMENTS

| | | | | |
|---|---|---|---|---|
| 3,988,604 A | * | 10/1976 | Raymond, Jr. ................ | 708/190 |
| 4,242,675 A | * | 12/1980 | Boone et al. ................. | 345/168 |
| 4,583,092 A | * | 4/1986 | Saito .............................. | 341/26 |
| 4,587,519 A | * | 5/1986 | Munetsugu et al. .......... | 345/169 |
| 5,140,539 A | * | 8/1992 | Ohdaira ....................... | 713/321 |

FOREIGN PATENT DOCUMENTS

JP    10133798 A  *  5/1998
JP    03-233623      10/1999

OTHER PUBLICATIONS

NJU6535 1/3, 1/4 Duty LCD Driver datasheet, New Japan Radio Co. Ltd., Feb. 8, 2006, pp. 1-30.*

* cited by examiner

*Primary Examiner* — Nitin Patel
*Assistant Examiner* — Dorothy Harris
(74) *Attorney, Agent, or Firm* — Foley & Lardner LLP

(57) ABSTRACT

A liquid crystal display (LCD) controller includes a plurality of segment/key source control circuits connected with an LCD panel and a key matrix through a plurality of segment/key source terminals, to periodically output a signal for one frame which contains a display output period and a key source output period. The plurality of segment/key source control circuits output to the plurality of segment/key source terminals during the display output period, segment signals having display drive voltages indicating a maximum value, a minimum value, and intermediate values between the maximum value and the minimum value. The plurality of segment/key source control circuits output first key scan pulse signals varying between the maximum value and the minimum value to the plurality of segment/key source terminals during the key source output period in a key scan state when the key matrix has been operated, and then, second key scan pulse signals obtained by inverting the first key scan pulse signals to the corresponding segment/key source terminal.

12 Claims, 18 Drawing Sheets

LCD CONTROLLER AND LCD CONTROL METHOD

BACKGROUND OF THE INVENTION

1. Field of the Invention

The present invention relates to an LCD (Liquid Crystal Display) controller connected to a key matrix and to an LCD through terminals. This Patent Application is based on Japanese Patent Application No. JP 2007-129871. The disclosure thereof is incorporated herein by reference.

2. Description of Related Art

A general electronic apparatus to which an LCD controller is applied will be described. The electronic apparatus is provided with an LCD, a key matrix, and a microcomputer.

FIG. 1A shows an LCD panel 100 that is the above-mentioned LCD. The LCD panel 100 has LCD back electrodes and LCD front electrodes. In case of M time division, the LCD back electrodes are M division back electrodes (M is an integer of two or more). The LCD front electrodes are N division front electrodes (N is an integer of two or more).

The microcomputer is provided with M COM terminals as common (COM) outputs and N SEG terminals as segment (SEG) outputs. Below, the M COM terminals and the N SEG terminals are referred to as terminals COM0 to COM(M−1) and terminals SEG0 to SEG(N−1), respectively. The terminals COM0 to COM(M−1) are connected to the M back electrodes of the LCD panel 100, respectively. The terminals SEG0 to SEG(N−1) are connected to the N front electrodes of the LCD panel 100, respectively.

The microcomputer is provided with an LCD controller (not shown). The LCD controller executes an LCD display output process of periodically outputting a signal for one frame.

The LCD display output process will be described taking a case of generally used ⅓ bias and M time division as an example. As shown in FIG. 1B and FIG. 1C, supposing that a period of one frame is TF, a unit time of time division is TL, and M is four, TF is expressed by 4×TL.

As shown in FIG. 1B, the LCD controller outputs common signals to the terminals COM0 to COM(M−1). The common signal has a display drive voltage indicating a maximum value Vlcd, a minimum value Vgnd, and intermediate values between the maximum value Vlcd and the minimum value Vgnd, and the minimum value Vgnd of the display drive voltage shows a ground voltage. In case of ⅓ bias, the intermediate values are ⅓Vlcd and ⅔Vlcd. For example, the LCD controller outputs the maximum values Vlcd the terminals COM0 to COM(M−1) as the first to M$^{th}$ values to in this order. Here, the LCD controller outputs the maximum value Vlcd of the display drive voltage to the terminals COM0 to COM(M−1) as a below-mentioned selection level, and immediately after, outputs the minimum value Vgnd to the terminals COM0 to COM(M−1). Moreover, the LCD controller outputs an intermediate value ⅓Vlcd to the terminals COM0 to COM(M−1) as a non-selection level, and immediately after, outputs an intermediate value ⅔Vlcd to the terminals COM0 to COM(M−1).

As shown in FIG. 1C, the LCD controller outputs segment signals to the terminals SEG0 to SEG(N−1). The segment signal has a display drive voltage indicating the maximum value Vlcd, the minimum value Vgnd, and the intermediate values ⅓Vlcd and ⅔Vlcd. The LCD controller outputs the minimum value Vgnd of the display drive voltage to the terminals SEG0 to SEG(N−1) as a below-mentioned selection level, and immediately after, outputs the maximum value Vlcd to the terminals SEG0 to SEG(N−1). Moreover, the LCD controller outputs the intermediate value ⅔Vlcd to the terminals SEG0 to SEG(N−1) as a non-selection level, and immediately after, outputs the intermediate value ⅓Vlcd to the terminals SEG0 to SEG(N−1).

Here, it is supposed that the common voltage indicating value (Vlcd, Vgnd) (⅓Vlcd, ⅔Vlcd) supplied to the terminals COM0 to COM(M−1) during a unit time TL is Vcom, and the segment voltage indicating value (Vlcd, Vgnd) (⅓Vlcd, ⅔Vlcd) supplied to the terminals SEG0 to SEG(N−1) during the unit time TL is Vseg. In this case, a relation shown in the following equation (1) is satisfied in the unit time TL. thus, charge remaining between the electrodes of the LCD panel 100 is negated.

$$\int (Vcom-Vseg)dt = 0 \qquad (1)$$

As shown in FIG. 1D, when the maximum value Vlcd of the display drive voltage is supplied to the terminal COM(I−1) (I is an integer satisfying 1≦I≦M) as a selection level, the back electrode corresponding to the terminal COM(I−1) is selected from among M back electrodes of the LCD panel 100. Moreover, when the minimum value Vgnd of the display drive voltage is supplied to the terminal SEG(J−1) (J is an integer satisfying 1≦J≦N) as the segment signal, the front electrode corresponding to the terminal SEG(J−1) is selected from among the N front electrodes of the LCD panel 100. Then, when the back electrode corresponding to the terminal COM(I−1) and the front electrode corresponding to the terminal SEG(J−1) are selected, display data corresponding to the common signal and the segment signal are displayed by using the back electrode and the front electrode. Otherwise, the display data is not displayed.

For example, as shown in FIG. 1E, when at the same time, the maximum value Vlcd of the display drive voltage is supplied to the terminal COM0 and the minimum value Vgnd of the display drive voltage is supplied to the terminals SEG0, SEG2, and SEG3, the display data is displayed by using the back electrodes and the front electrodes corresponding to the terminal COM0 and the terminals SEG0, SEG2, and SEG3. Similarly, when at the same time, the maximum value Vlcd is supplied to the terminal COM1 and the minimum value Vgnd is supplied to the terminals SEG1, SEG2, and SEG3, the display data is displayed by using the back electrodes and the front electrodes corresponding to the terminal COM1 and the terminals SEG1, SEG2, and SEG3. Moreover, when at the same time, the maximum value Vlcd is supplied to the terminal COM2 and the minimum value Vgnd is supplied to the terminals SEG0 and SEG1, the display data is displayed by using the back electrodes and the front electrodes corresponding to the terminal COM2 and the terminals SEG0 and SEG1. Furthermore, when at the same time, the maximum value Vlcd is supplied to the terminal COM3 and the minimum value Vgnd is supplied to the terminals SEG0, SEG1, and SEG3, the display data is displayed by using the back electrodes and the front electrodes corresponding to the terminal COM3 and the terminals SEG0, SEG1, and SEG3, respectively.

FIG. 2A shows a key matrix 200 that is the above-mentioned key matrix. The key matrix 200 has keys in a matrix of m rows and n columns (m and n are integers of one or more).

The microcomputer is further provided with a key sense circuit (not shown), n key source (KS) terminals, and m key return (KR) terminals. Below, n KS terminals and m KR terminals are referred to as terminals KS0 to KS(n−1) and terminals KR0 to KR(m−1), respectively. The terminals KS0 to KS(n−1) are connected to the column of the key matrix 200, respectively. The terminals KR0 to KR(m−1) are connected to the row of the key matrix 200, respectively.

A power supply is connected between the terminals KR0 to KR(m−1) and the row of the key matrix 200 through m resistance elements, respectively. In this case, the terminals KR0 to KR(m−1) are supplied with the maximum value Vlcd of the display drive voltage by the power supply.

The key matrix 200 further has an N-channel MOSFET and is turned on when the key at the $i^{th}$ row and the $j^{th}$ column (i is an integer satisfying 1≦i≦m, and j is an integer satisfying 1≦j≦n) is operated and connects the terminal KR(i−1) and the terminal KS(j−1). The terminal KS(j−1) is used as an N-channel open drain so that even if the keys are operated simultaneously, it may not cause a problem. When the key of the $i^{th}$ row and the $j^{th}$ column is operated, if the minimum value Vgnd of the display drive voltage is supplied to the terminal KS(j−1); the minimum value Vgnd is supplied to the terminal KR(i−1).

The key sense circuit executes a key source (KS) output process. Below, the KS output process will be described.

Now, it is supposed that none of the keys of the key matrix 200 of m rows and n columns is operated. This state is referred to as a key-in wait state.

In the key-in wait state, as shown in FIG. 2A, the key sense circuit continues to output the minimum value Vgnd of the display drive voltage to the terminals KS0 to KS (N−1). Here, it is supposed that a signal level of a signal indicating the maximum value Vlcd of the display drive voltage is a high level (High) "1," and a signal level of a signal indicating the minimum value Vgnd of the display drive voltage is a low level (Low) "0." As described above, the maximum value Vlcd is supplied to the terminals KR0 to KR(m−1). When all the signal levels of the signals supplied to the terminals KR0 to KR(M−1) are "1," the key sense circuit recognizes that none of the keys in the matrix of m rows and n columns is operated.

When the user operates one key at the $i^{th}$ row and the $j^{th}$ column, the minimum value Vgnd is supplied to the terminal KR(i−1) if the minimum value Vgnd is supplied to the terminal KS(j−1) during a KS output period. Since the signal level of the signal supplied to the terminal KR(i−1) is Low "0," the key sense circuit discriminates the key in the $i^{th}$ row and the $j^{th}$ column as the key operated by the user among the keys in the matrix of m rows and n columns. In this case, the interrupt is generated.

When the interrupt is caused, a key scan process is executed (this is called a key scan state).

In the key scan state, as shown in FIG. 2B, the key sense circuits output the pulse signals pls which vary between the maximum value Vlcd "1" and the minimum value Vgnd "0" of the display drive voltage to the terminals KS0 to KS(n−1) at respective different timings. For example, the pulse signal pls shows the minimum value Vgnd "0," and the key sense circuit outputs the first to $n^{th}$ pulse signals pls to the terminals KS0 to KS(n−1) in this order.

Now, it is supposed that the matrix is composed of three rows and three columns, the first, the second, and the third rows of the first, the second, and the third columns are buttons A to C, buttons D to F, and buttons G to I, respectively. In this case, as shown in FIG. 2C, in the key scan state, a first determination is done as follows. That is, when the minimum value Vgnd "0," the maximum value Vlcd "1" and the maximum value Vlcd "1" of the display drive voltage are outputted to the respective. terminals SEG/KS0 to SEG/KS2 (Step S101), the microcomputer determines that the user operated a button A (Step S103) if the minimum value "0" is supplied to the terminal KR0 (Step S102—YES). A second determination is done as follows. that is, when the maximum value Vlcd "1" the minimum value Vgnd "0" and the maximum value Vlcd "1" are outputted to the respective terminals KS0 to KS2 (Steps S101, S102—NO, and S104), the microcomputer determines that the user operates a button B (Step S106), if the minimum value Vgnd "0" is supplied to the terminal KR0 (Step S105—YES). A third determination is done as follows. That is, when the maximum value Vlcd "1" the maximum value Vlcd "1," and the minimum value Vgnd "0" are outputted to the respective terminals KS0 to KS2 (Steps S101, S102—NO, S104, S105—NO, and S107), the microcomputer determines that the user operated a button C (Step S109), if the minimum value Vgnd "0" is supplied to the terminal KR0 (Step S108—YES) As the fourth determination, when the microcomputer determines that the buttons A to C were not operated (Step S110), the Steps S101 to S110 will be executed for the buttons D to F and the buttons G to I.

From the above, subjects that need to be done for the above-mentioned electronic apparatus are summarized below. First, as subjects needed for the KS output process, followings are desired.

[I] In the key-in wait state, the LCD controller must continue to output the minimum value Vgnd "0" of the display drive voltage to the terminals KS0 to KS(N−1) and to wait generation of interrupt (a state in which the CPU is performing no key scan).

[II] In the key scan state, the minimum value Vgnd "0" of the display drive voltage must be outputted to the terminals KS0 to KS(N−1) at respective different timings as pulse signals pls.

[III] Even if the keys in the key matrix 200 are operated simultaneously, no problem is caused (the terminals KS0 to KS(n−1) must be N-channel open drains).

Moreover, in case of ⅓ bias, as subjects that are needed for a common output and a segment output, the followings are desired.

[IV] When displaying the display data by using the electrodes of the LCD panel 100, the maximum value Vlcd of the display drive voltage must be outputted to the terminal COM(I−1) (I is an integer satisfying 1≦I≦M), and the minimum value Vgnd of the display drive voltage is outputted to the terminal SEG(J−1) (J is an integer satisfying 1≦J≦N).

[V] When not displaying the display data by using the electrodes of the LCD panel 100, an intermediate value ⅓Vlcd of the display drive voltage must be outputted to the terminal COM(I−1) (a ⅓ bias mode).

[VI] In order to negate a residual charge between the electrodes of the LCD panel 100, the above-mentioned equation (1) must be satisfied in one frame.

In recent years, miniaturization of chips and packages that are used for the microcomputer is required. For example, as shown in FIG. 3, Japanese Patent Application Publication (JP-A-Heisei 3-233623) describes a microcomputer 300 in which the number of terminals is reduced.

The microcomputer 300 is provided with the terminals COM0 to COM(M−1) and the terminals KR0 to KR(m−1). Moreover, the microcomputer 300 is provided with N segments (SEG)/key source (KS) terminals instead of the terminals SEG0 to SEG(N−1) and the terminals KS0 to KS(N−1). Below, the N SEG/KS terminals are referred to as terminals SEG/KS0 to SEG/KS(N−1). Here, among the terminals SEG/KS0 to SEG/KS(N−1), the terminals SEG/KS0 to SEG/KS (n−1) are connected to columns of the key matrix 200. Thus, the terminals SEG/KS0 to SEG/KS(N−1) are shared as the terminals SEG0 to SEG(N−1) and the terminals KS0 to KS(n−1).

The microcomputer 300 is provided with m voltage comparator circuits 301 that are connected between the terminals KR0 to KR(m−1) and the rows of the key matrix 200, respectively, and m flip-flop circuits 302 that are connected between the terminals KR0 to KR(m−1) and the m voltage comparator circuits 301, respectively. The m flip-flop circuits 302 are used as a memory section.

The microcomputer 300 periodically outputs common signals and the segment signals for one frame. In this case, the one frame includes an LCD display output period when the above-mentioned LCD display output process is executed and the KS output period when a below-mentioned key source (KS) output process is executed.

First, the LCD display output process is executed. During the LCD display output period, the microcomputer 300 outputs the common signals to the terminals COM0 to COM(M−1), and outputs the segment signals to the terminals SEG/KS0 to SEG/KS(N−1).

Next, the KS output process is executed.

The microcomputer 300 outputs the intermediate value ⅓Vlcd to the terminals COM0 to COM(M−1) as a non-selection level, for example, during the KS output period of an odd-number frame, and outputs the intermediate value ⅔Vlcd to the terminals COM0 to COM(M−1) during the KS output period of an even-number frame.

During the KS output period in a first frame, the microcomputer 300 outputs the intermediate value ⅓Vlcd of the display drive voltage to the terminal SEG/KS0, and outputs the intermediate value ⅔Vlcd to the terminals SEG/KS other than it. Next, during the KS output period in a second frame, the microcomputer 300 outputs the intermediate value ⅔Vlcd of the display drive voltage to the terminal SEG/KS0, and outputs the intermediate value ⅓Vlcd to the terminals SEG/KS other than it. Similarly, during the KS output period in the $(2N-1)^{th}$ frame, the microcomputer 300 outputs the intermediate value ⅓Vlcd to the terminal SEG/KS(N−1), and outputs the intermediate value ⅔Vlcd to the terminals SEG/KS other than it. Next, during the KS output period in the $2N^{th}$ frame, the microcomputer 300 outputs the intermediate value ⅔Vlcd to the terminal SEG/KS(N−1), and outputs the intermediate value ⅓Vlcd to the terminals SEG/KS other than it.

When the user operates the key in the $i^{th}$ row and the $j^{th}$ column (i is an integer satisfying $1 \leq i \leq m$, and j is an integer satisfying $1 \leq j \leq n$), an $i^{th}$ voltage comparator circuit 301 is supplied with the intermediate value ⅓Vlcd if the intermediate value ⅓Vlcd of the display drive voltage is supplied to the terminal KS(j−1) during the KS output period. The $i^{th}$ voltage comparator circuit 301 outputs the intermediate value ⅓Vlcd to the terminal KS(j−1) as the minimum value Vgnd "0" through the $i^{th}$ flip-flop 302, while the voltage comparator circuits 301 other than the above-mentioned $i^{th}$ voltage comparator circuit 301 output the intermediate value ⅔Vlcd to the terminals KS other than the terminal KS(j−1) as the maximum value Vlcd "1" through the flip-flops 302 other than the above-mentioned $i^{th}$ flip-flop 302. Thus, the microcomputer 300 discriminates the key operated by the user.

However, there are the following problems in the microcomputer 300.

First, in the microcomputer 300, when the key operated by the user is discriminated in the key scan state, as described above, a constant value of the display drive voltage (the intermediate value ⅓Vlcd or the intermediate value ⅔Vlcd) is supplied to the key matrix 200 through the terminals SEG/KS0 to SEG/KS(N−1) during the KS output period. In this case, the constant value is also supplied to the LCD panel 100 from the terminals SEG/KS0 to SEG/KS (N−1). For this reason, charge will remain in the front electrodes of the LCD panel 100. Thus, it is desired to reduce the charge remaining in the LCD panel 100 as well as reduction of the number of the terminals.

Second, in the microcomputer 300, 2N frames are regarded as one period, and the intermediate value ⅓Vlcd is outputted to the respective terminals SEG/KS0, SEG/KS1, . . . , SEG/KS(N−1) during the KS output period of the first, third, . . . , $(2N-1)^{th}$ frames. As a result, when the above-mentioned N is enlarged (when the number of the terminals SEG/KS is increased), a very large time is required to perform the key scan. For this reason, it requires a very large time to discriminate the key operated by the user from among the keys of the key matrix 200. Therefore, there is a possibility that the key scan may not be executed well.

Third, the microcomputer 300 needs the m voltage comparator circuits 301 for converting the intermediate value ⅓Vlcd and the intermediate value ⅔Vlcd into the minimum value Vgnd "0" and the maximum value Vlcd "1," respectively, and outputting them to the terminals KR0 to KR(m−1).

SUMMARY

In an aspect of the present invention, a liquid crystal display (LCD) controller includes a plurality of segment/key source control circuits connected with an LCD panel and a key matrix through a plurality of segment/key source terminals, to periodically output a signal for one frame which contains a display output period and a key source output period. The plurality of segment/key source control circuits output to the plurality of segment/key source terminals during the display output period, segment signals having display drive voltages indicating a maximum value, a minimum value, and intermediate values between the maximum value and the minimum value. The plurality of segment/key source control circuits output first key scan pulse signals varying between the maximum value and the minimum value to the plurality of segment/key source terminals during the key source output period in a key scan state when the key matrix has been operated, and then, second key scan pulse signals obtained by inverting the first key scan pulse signals to the corresponding segment/key source terminal.

In another aspect of the present invention, a LCD control method includes periodically outputting a signal for one frame which contains a display output period and a key source output period. The outputting includes carrying out a first output of segment signals to a plurality of segment/key source terminals during the display output period, wherein the segment signal has a display drive voltage indicating a maximum value, a minimum value, and intermediate values between the maximum value and the minimum value, and carrying out a second output of first key scan pulse signals varying between the maximum value and the minimum value to the plurality of segment/key source terminals, and then, second key scan pulse signals obtained by inverting the first key scan pulse signals to the plurality of segment/key source terminals, during the key source output period in a key scan state when a key matrix has been operated.

According to the present invention, the LCD controller can negate charge remaining in the front electrodes of the LCD panel by supplying opposite values (the maximum value Vlcd and the minimum value Vgnd) in the key source output period (TK) in a key scan state.

Moreover, in the LCD controller of the present invention, a time required to discriminate the key operated by the user can be shortened largely compared to a system of performing key scan using 2N frames as in a conventional LCD controller.

Furthermore, the LCD controller of the present invention does not need m voltage comparator circuits as needed in the conventional LCD controller.

BRIEF DESCRIPTION OF THE DRAWINGS

The above and other objects, advantages and features of the present invention will be more apparent from the following description of certain embodiments taken in conjunction with the accompanying drawings, in which.

DESCRIPTION OF PREFERRED EMBODIMENTS

Hereinafter, an LCD controller of the present invention will be described in detail with reference to the attached drawings.

Figure 1A:
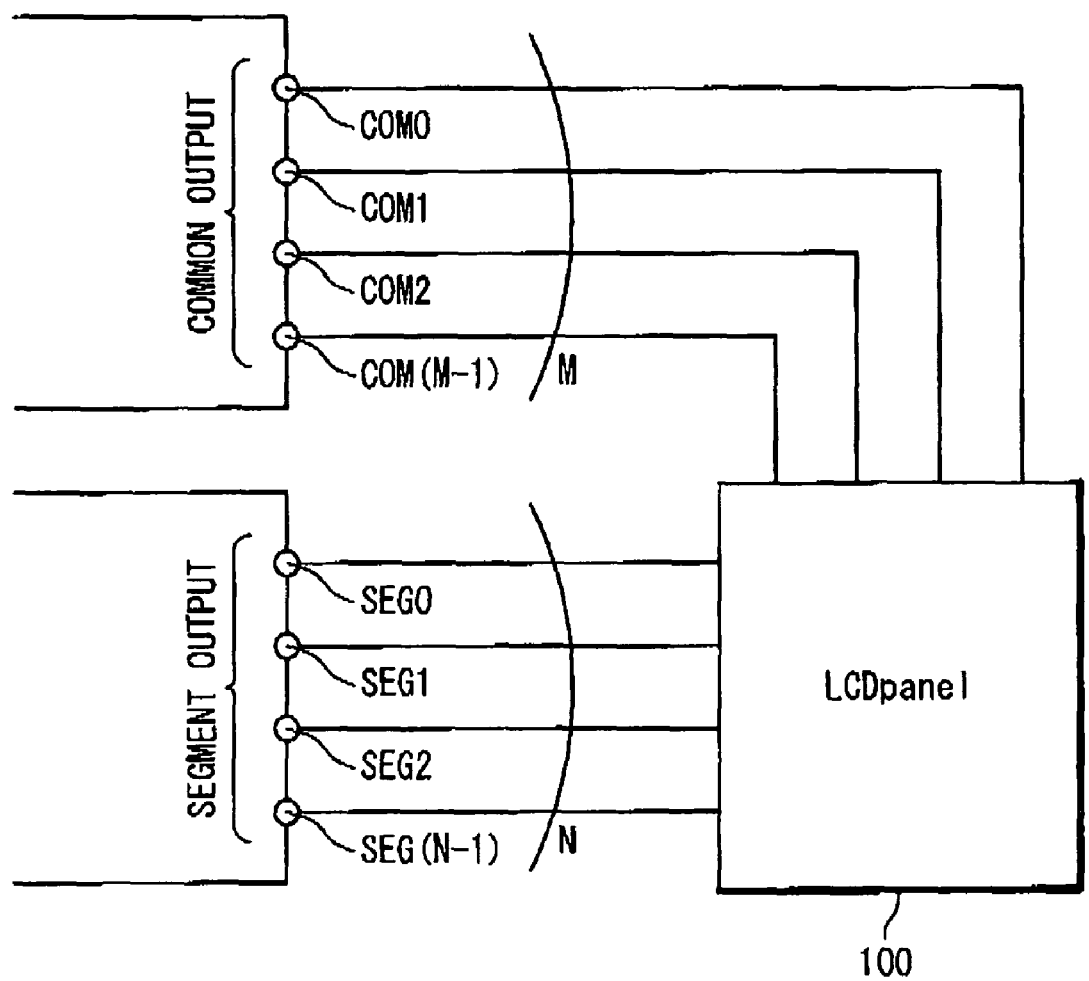
FIG. 1A is a diagram showing an LCD panel in a related art.
Figure 1B:
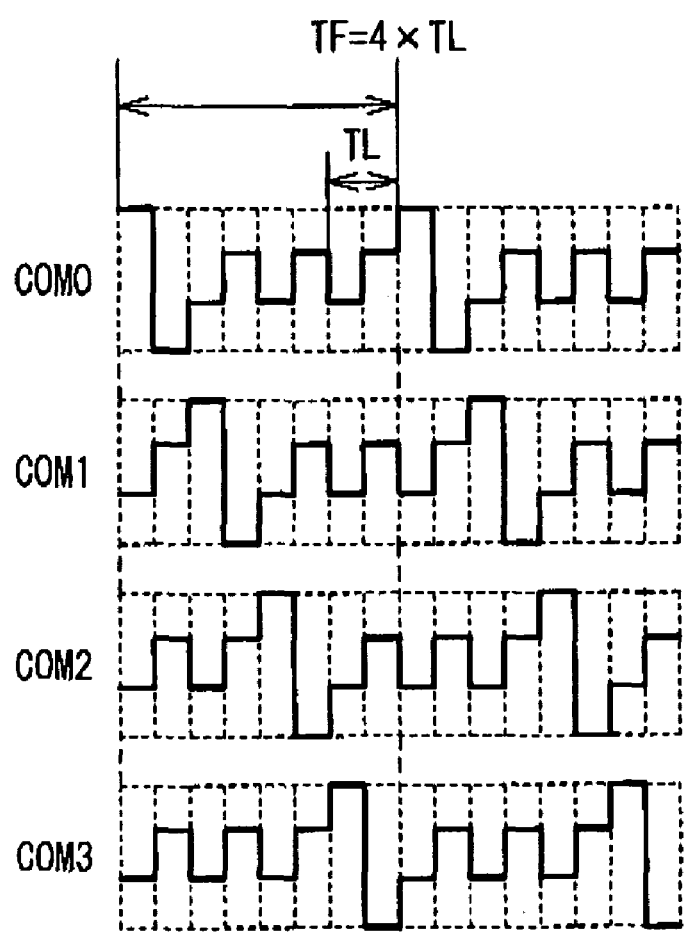
FIG. 1B is a diagram showing an LCD display output process in the related art.
Figure 1C:
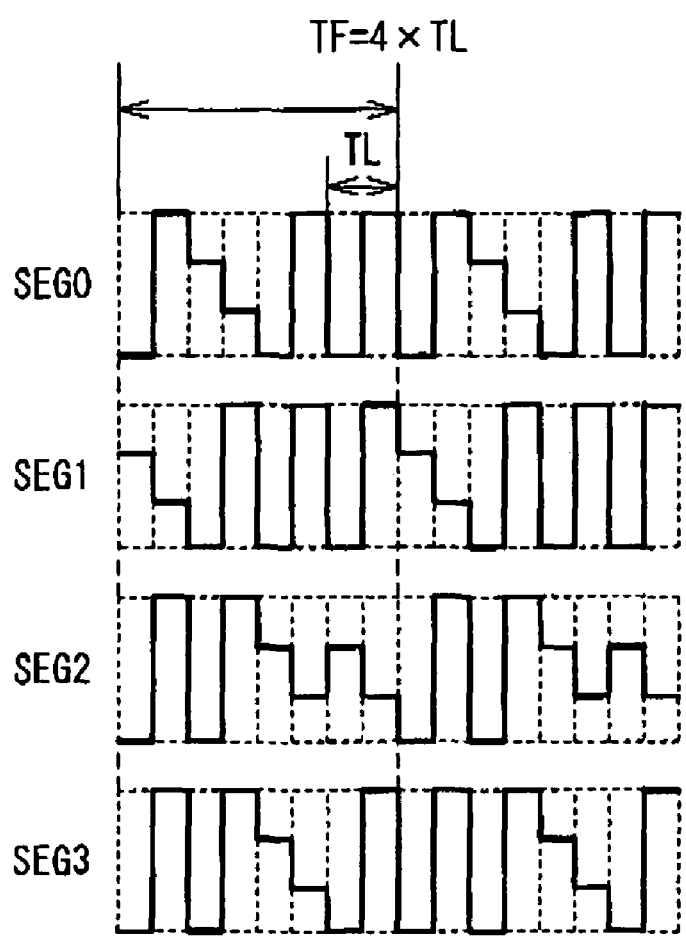
FIG. 1C is a diagram showing the LCD display output process in the related art.
Figure 1D:
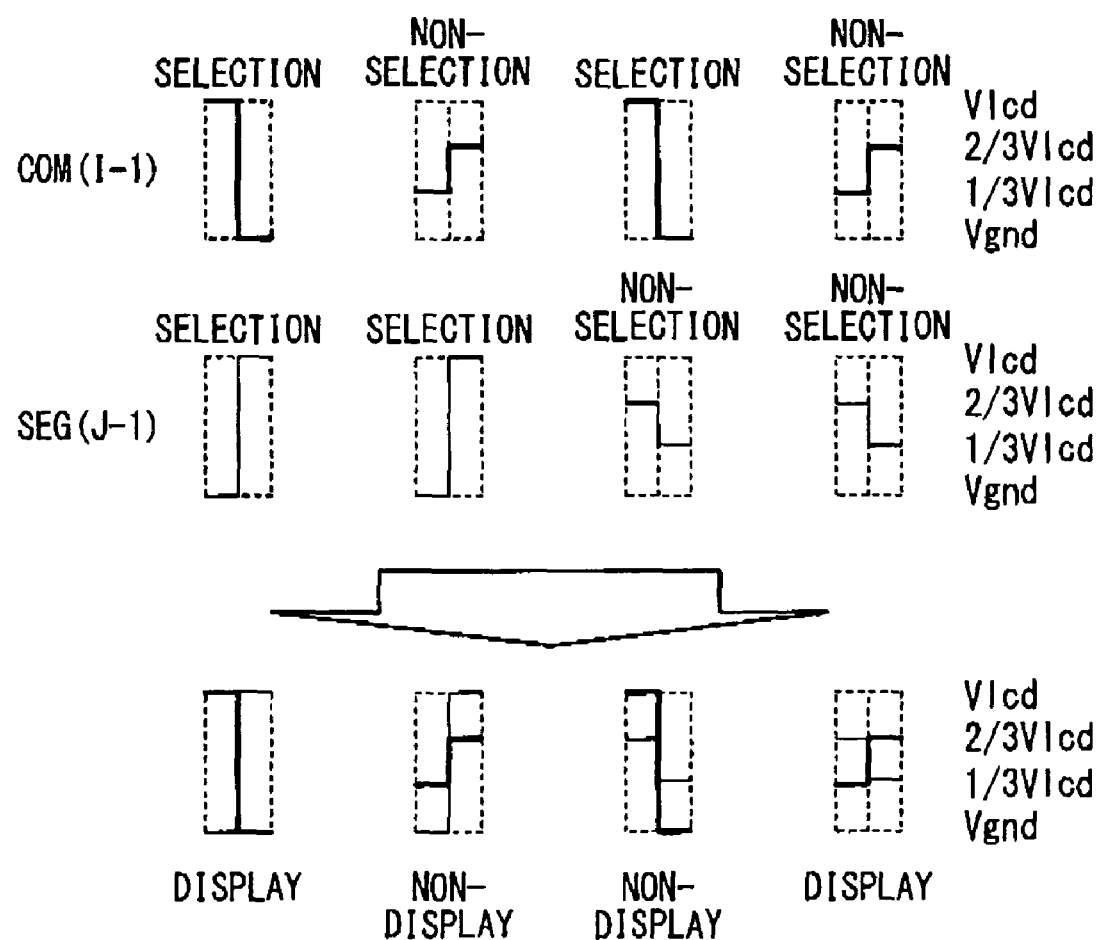
FIG. 1D is a diagram showing the LCD display output process in the related art.
Figure 1E:
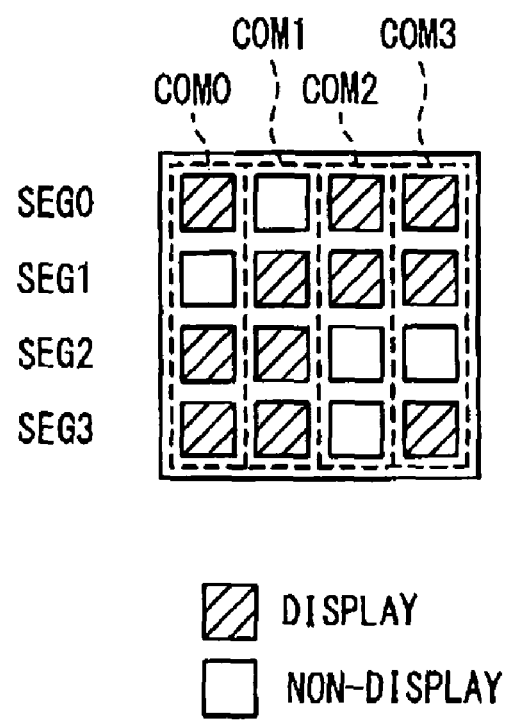
FIG. 1E is a diagram showing the LCD display output process in the related art.
Figure 2A:
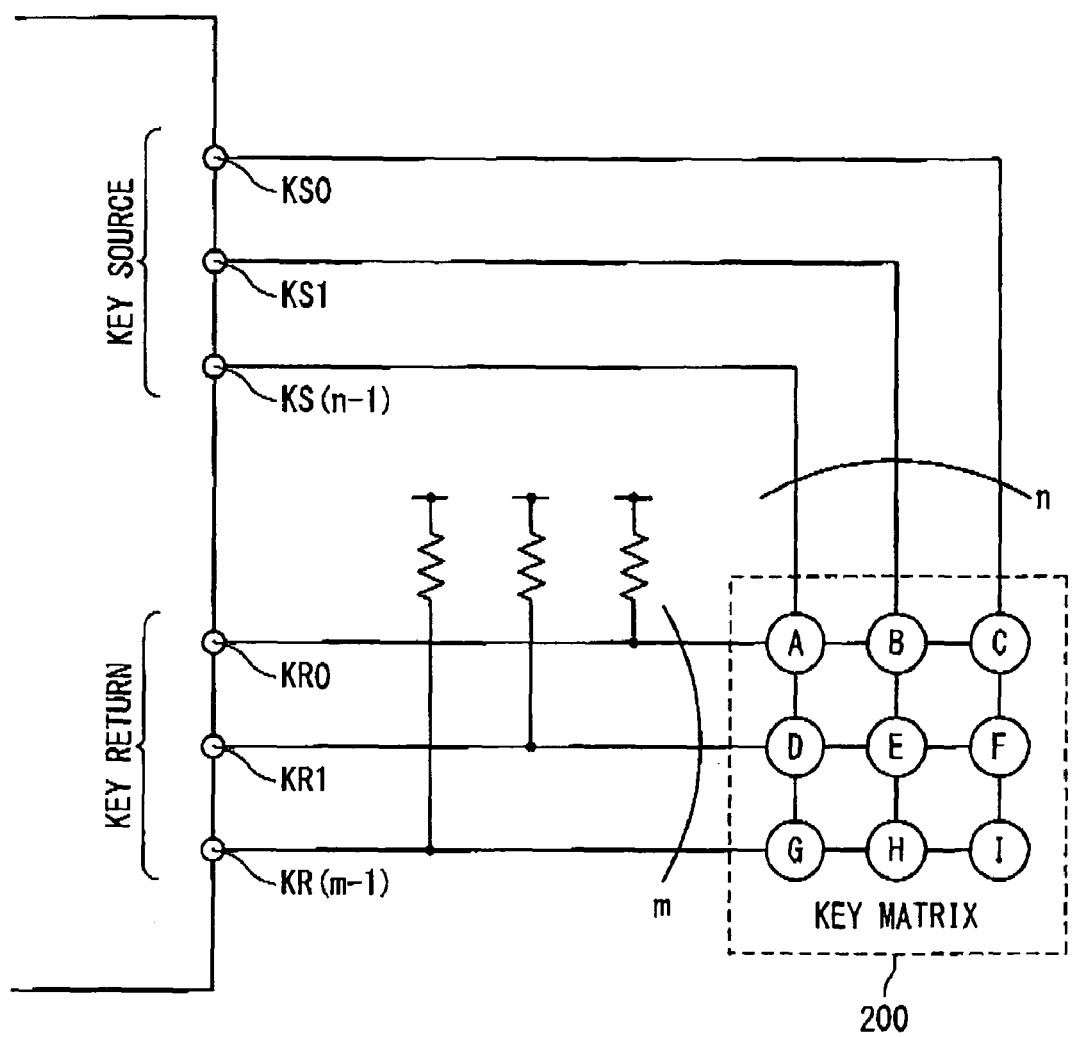
FIG. 2A is a diagram showing a key matrix 200 in the related art.
Figure 2B:
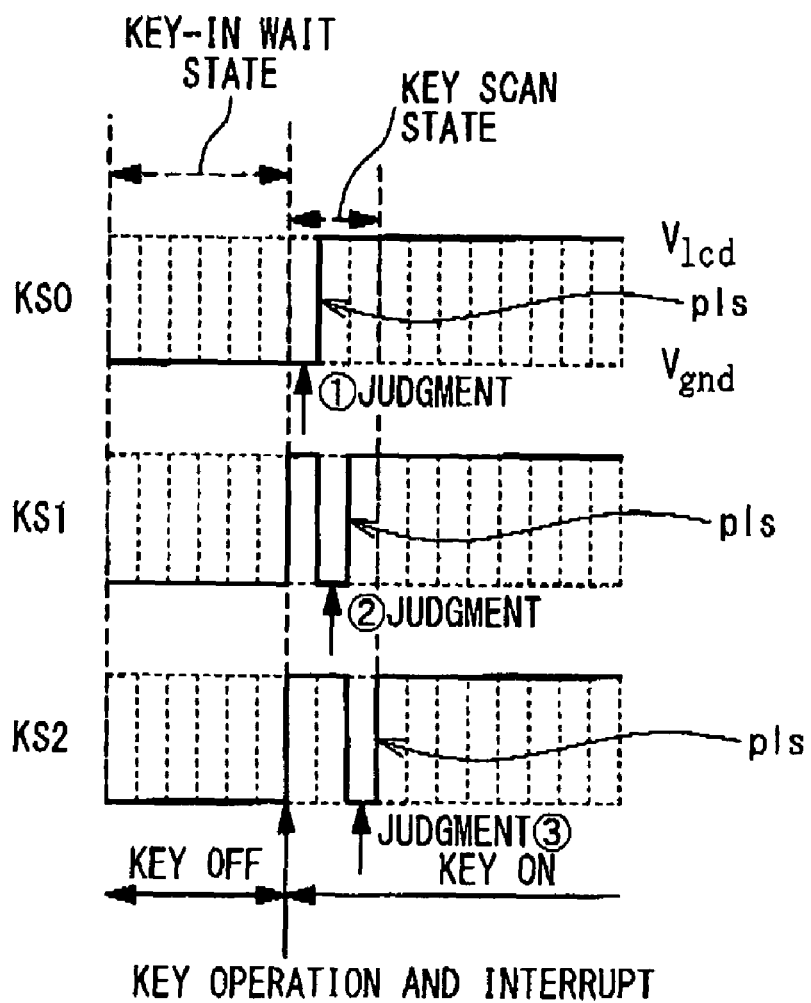
FIG. 2B is a diagram showing a key scan state in the related art.
Figure 2C:
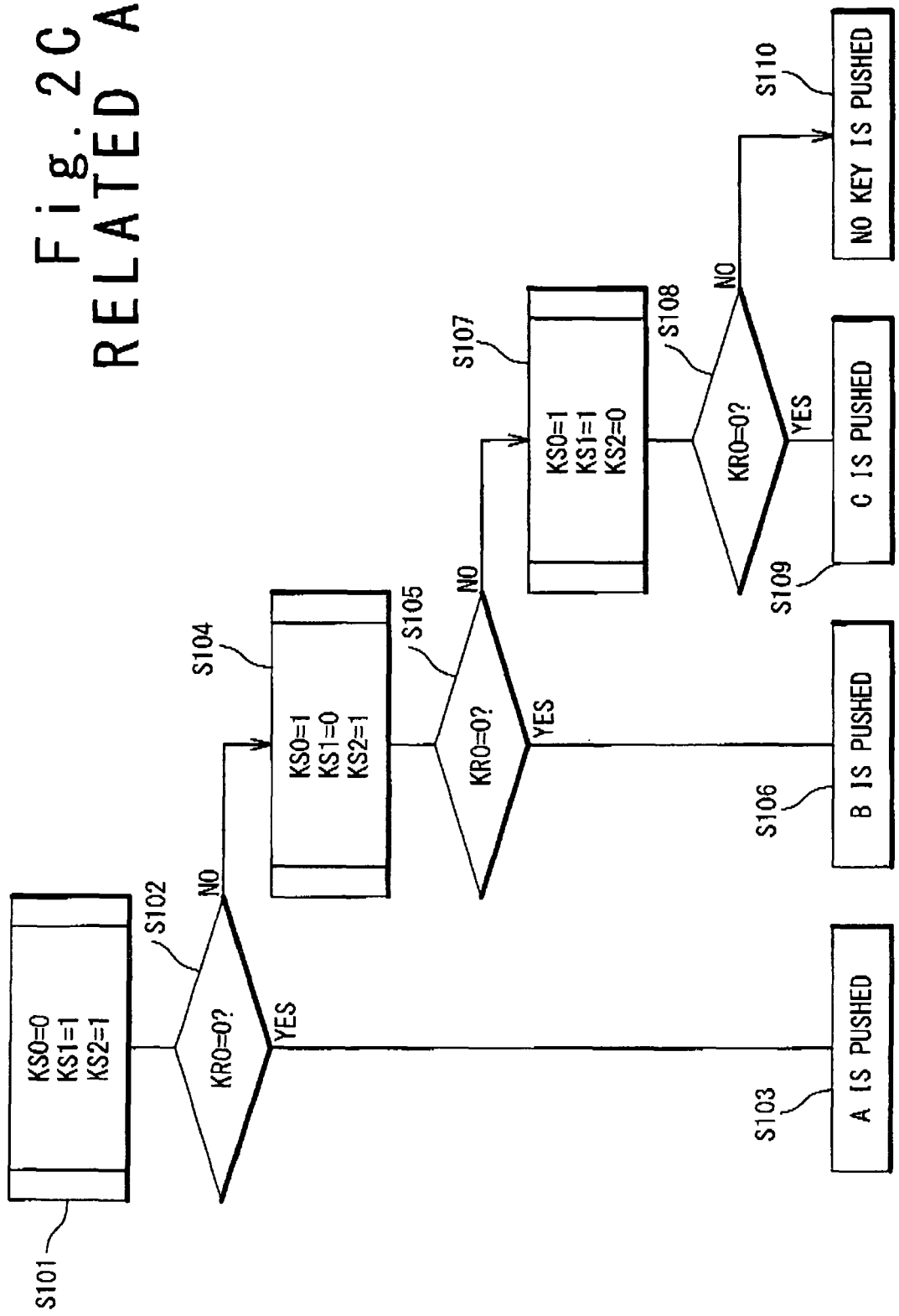
FIG. 2C is a flowchart showing the key scan state in the related art.
Figure 3:
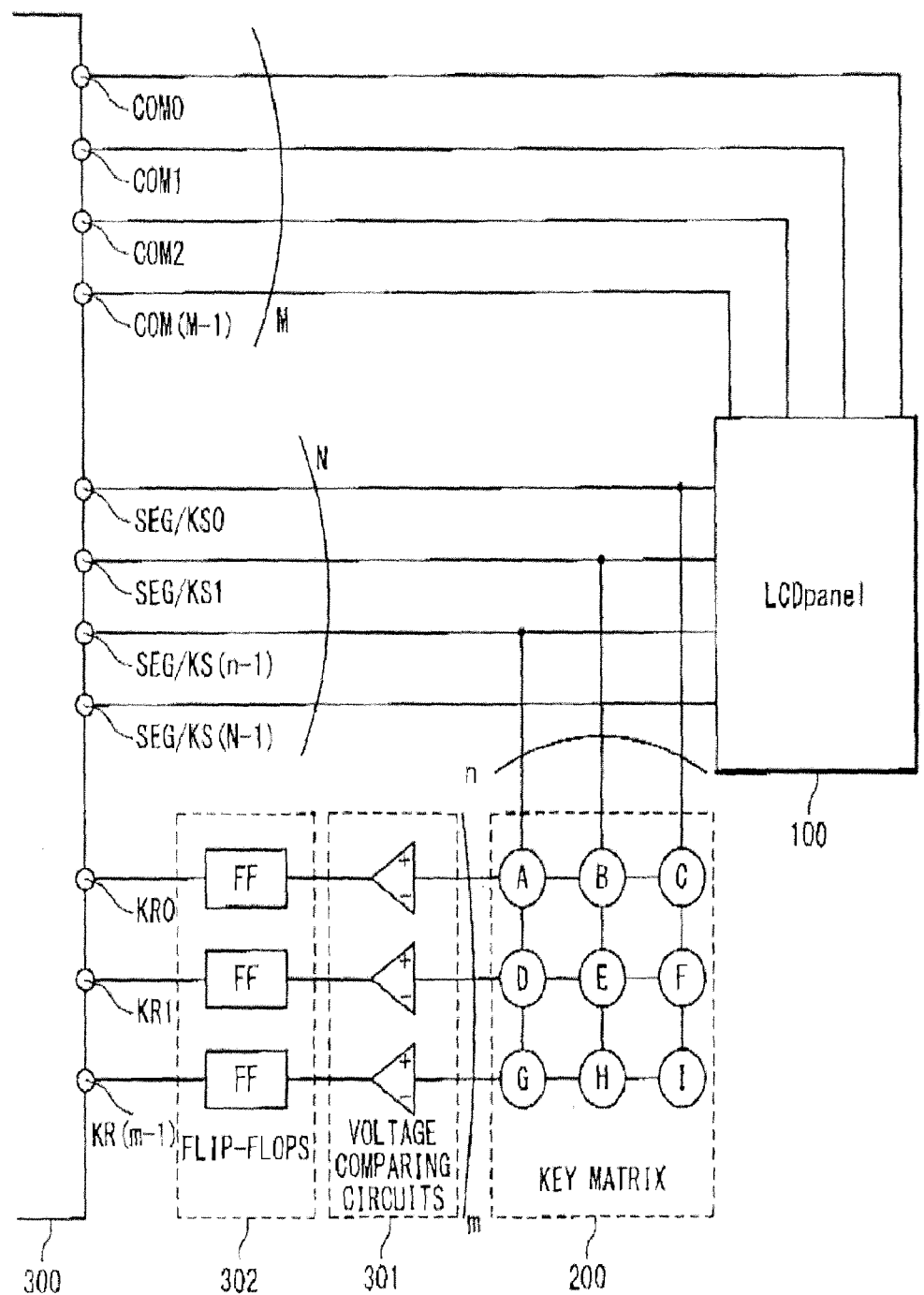
FIG. 3 is a diagram showing an electronic apparatus to which a controller is applied as an LCD controller driver in another related art.
Figure 4:
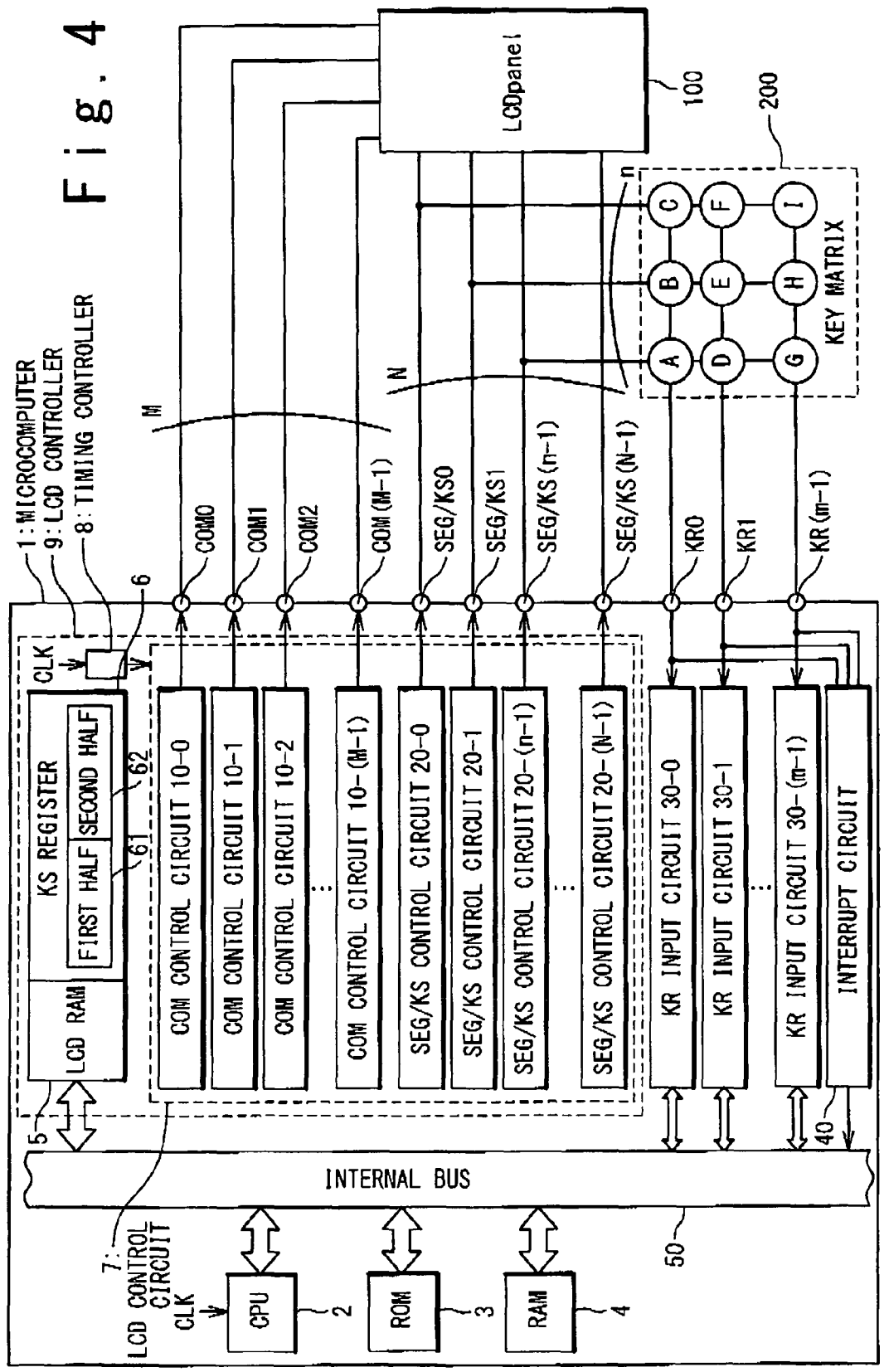
FIG. 4 is a block diagram showing an electronic apparatus to which an LCD controller of the present invention is applied.

FIG. 4 shows an electronic apparatus to which an LCD controller 9 of the present invention is applied. The electronic apparatus is provided with an LCD panel 100, a key matrix 200, and a microcomputer 1.

The LCD panel 100 has LCD back electrodes and LCD front electrodes. The LCD back electrodes are composed of M back electrodes (M is an integer of two or more). Moreover, the LCD front electrodes are composed of N front electrodes (N is an integer of two or more). The key matrix 200 has keys arranged in a matrix of m rows and n columns (m and n are integers of one or more).

The microcomputer 1 is provided with M common (COM) terminals, N segments (SEG)/key source (KS) terminals, and m key return (KR) terminals. Below, the M COM terminals, the N SEG/KS terminals, and the m KR terminals are referred to as terminals COM0 to COM(M−1), terminals SEG/KS0 to SEG/KS(N−1), and terminals KR0 to KR(m−1), respectively.

The terminals COM0 to COM(M−1) are connected to the M back electrodes of the LCD panel 100, respectively. The terminals SEG/KS0 to SEG/KS(N−1) are connected to the N front electrodes of the LCD panel 100, respectively. Here, the terminals SEG/KS0 to SEG/KS(N−1) are connected to the column of the key matrix 200, respectively. The terminals KR0 to KR(m−1) are connected to the rows of the key matrix 200, respectively.

The microcomputer has a CPU (Central processing Unit) 2, a ROM (Read Only Memory) 3, a RAM (Random Access Memory) 4, an LCD controller 9, m KR input circuits, an interrupt generating circuit 40, and an internal bus 50 to which the above sections are connected. Here, the m KR input circuits are referred to as KR input circuits 30-0 to 30-($m$−1).

The LCD controller 9 is provided with an LCD RAM 5, a key source (KS) register 6, an LCD control circuit 7, and a timing controller 8. The LCD RAM 5 and the KS register 6 are connected to the internal bus 50. The LCD control circuit 7 is connected to the LCD RAM 5, the KS register 6, and the timing controller 8.

The LCD control circuit 7 is provided with M COM control circuits and N SEG/KS control circuits. Below, the M COM control circuits and the N SEG/KS control circuits are referred to as COM control circuits 10-0 to 10-(M−1) and SEG/KS control circuits 20-0 to 20-(N−1), respectively. The COM control circuits 10-0 to 10-(M−1) are respectively connected to the terminals COM0 to COM(M−1). The SEG/KS control circuits 20-0 to 20-(N−1) are respectively connected to the terminals SEG/KS0 to SEG/KS(N−1).

The KR input circuits 30-0 to 30-($m$−1) are connected to the KR terminals KR0 to KR(m−1), respectively. The KR input circuits 30-0 to 30-($m$−1) monitor the KR terminals KR0 to KR(m−1), and when the key matrix 200 is operated, they output monitoring results. Here, a state that the key matrix 200 is not operated is referred to as a key-in wait state, and a state that the key matrix 200 is operated is referred to as a key scan state.

The interrupt generating circuit 40 is connected to the KR terminals KR0 to KR(m−1) at its input, and its output is connected to the internal bus 50. The interrupt generating circuit 40 generates an interrupt signal according to the monitoring result.

The CPU 2 operates in response to a clock signal CLK supplied an external or internal unit. The ROM 3 stores a value showing a predetermined signal. Moreover, the CPU 2 discriminates the key related to the i$^{th}$ row and the j$^{th}$ column (i is an integer satisfying 1≦i≦m, and j is an integer satisfying 1≦j≦n) operated by a user, from among the keys of the key matrix 200 with m rows and n columns in response to the interrupt signal and the monitored result.

The above-mentioned predetermined signal includes a common signal. The common signal is used when an LCD display output process to be described later is executed. The common signal has a display drive voltage indicating a maximum value Vlcd, a minimum value Vgnd, and an intermediate value between the maximum value Vlcd and the minimum value Vgnd. The minimum value Vgnd of the display drive voltage shows the ground voltage. In case of generally used ⅓ bias, the intermediate value indicates ⅓Vlcd or ⅔Vlcd.

The predetermined signal further includes a segment signal. The segment signal is used when the below-mentioned LCD display output process is performed. This segment signal has the display drive voltage that shows the maximum value Vlcd, the minimum value Vgnd and the intermediate values ⅓Vlcd and ⅔Vlcd.

The predetermined signal further includes a first non-display signal and a second non-display signal. The first non-display signal and the second non-display signal are used when a key source (KS) output process to be described later is executed. The first non-display signal indicates either one of the intermediate value of ⅓Vlcd and the intermediate value ⅔Vlcd of the display drive voltage, and the second non-display signal indicates the other of the intermediate value of ⅓Vlcd and the intermediate value of ⅔Vlcd.

The predetermined signal further includes a first key-in wait signal and a second key-in wait signal. The first key-in wait signal and the second key-in wait signal are used in the key-in wait state when a KS output process to be described later is executed. The first key-in wait signal indicates either one of the maximum value of Vlcd and the minimum value of Vgnd of the display drive voltage, and the second key-in wait signal indicates the other of the maximum value of Vlcd and the minimum value of Vgnd. The first key-in wait signal and the second key-in wait signal are used in the key-in wait state.

The predetermined signal further includes a first key scan pulse signal and a second key scan pulse signal. The first key scan pulse signal and the second key scan pulse signal are used in the key scan state, when a KS output process to be described later is executed. The first key scan pulse signal is a signal whose voltage level varies between the maximum value Vlcd and the minimum value Vgnd of the display drive voltage, and its peak voltage value indicates either one of the maximum value Vlcd and the minimum value Vgnd of the display drive voltage. The second key scan pulse signal is a signal obtained by inverting the first key scan pulse signal, and its peak voltage value indicates the other of the maximum value Vlcd and the minimum value Vgnd.

The common signal, the first non-display signal, and the second non-display signal are used as a common output signal for one frame. A value showing the common output signal is a fixed value. The segment signal, the first key-in wait signal, and the second key-in wait signal are used as a segment output signal for one frame. The CPU 2 stores a value showing the segment output signal in the LCD RAM 5.

Upon generation of the interrupt signal, the CPU 2 executes a key scan process (this is called a key scan state).

The CPU 2 stores a value indicating the first key scan pulse signal and a value indicating the second key scan pulse signal in the KS register 6 in the key scan state. The KS register 6 is provided with a KS first-half register 61 and a KS second-half register 62. The KS first-half register 61 stores the first key scan pulse signal. The KS second-half register 62 stores the second key scan pulse signal.

One frame includes an LCD display output period when the LCD display output process to be described later is executed and a KS output period when a KS output process to be described later is executed. The KS output period includes a KS first-half output period and a KS second-half output period.

The LCD display output process and the KS output process will be described taking a case of ⅓ bias and M-period time division as an example.

It is supposed that a time period corresponding to the LCD display output period is TF, a time period corresponding to the KS output period is TK, the time period of one frame is TFK=TF+TK, and a unit time in the time division is TL (TL=TK), and M is four. In this case, $$TFK = TF + TK$$
$$= (4 \times TL) + TL$$
$$= 5 \times TL.$$

Also, supposing that a time period corresponding to the KS first-half output period of the KS output period is TK1 and a time period corresponding to the KS second-half output period of the KS output period is TK2, the TK1 and the TK2 correspond to a time ½TL.

The timing controller 8 outputs control signals Sks, Sks1, and Sks2 to the LCD control circuit 7 in response to the clock signal CLK. When the time ½TL is set as one count, the timing controller 8 outputs the control signals Sks, Sks1, and Sks2 in (2M+2) counts for one frame.

First, the signal levels of the control signals Sks, Sks1, and Sks2 are low levels "Low." The timing controller 8 sets the signal levels of the control signals Sks and Sks1 to a high level "High" when the count reaches 2M, and maintains the signal level "Low" of the control signal Sks2. A time from the first count to the $2M^{th}$ count corresponds to the LCD display output period.

When the count reaches (2M+1), the timing controller 8 maintains the signal level "High" of the control signal Sks, sets the control signal Sks1 to the low level "Low," and sets the control signal Sks2 to the high level "High." A time from the $2M^{th}$ count to the $(2M+1)^{th}$ count corresponds to the KS first-half output period.

When the count reaches (2M+2), the timing controller 8 maintains the control signal Sks1 in the signal level "Low", and sets the control signals Sks and Sks2 to the low level "Low." A time from the $(2M+1)^{th}$ count to the $(2M+2)^{th}$ count corresponds to the KS second-half output period.

Figure 5:
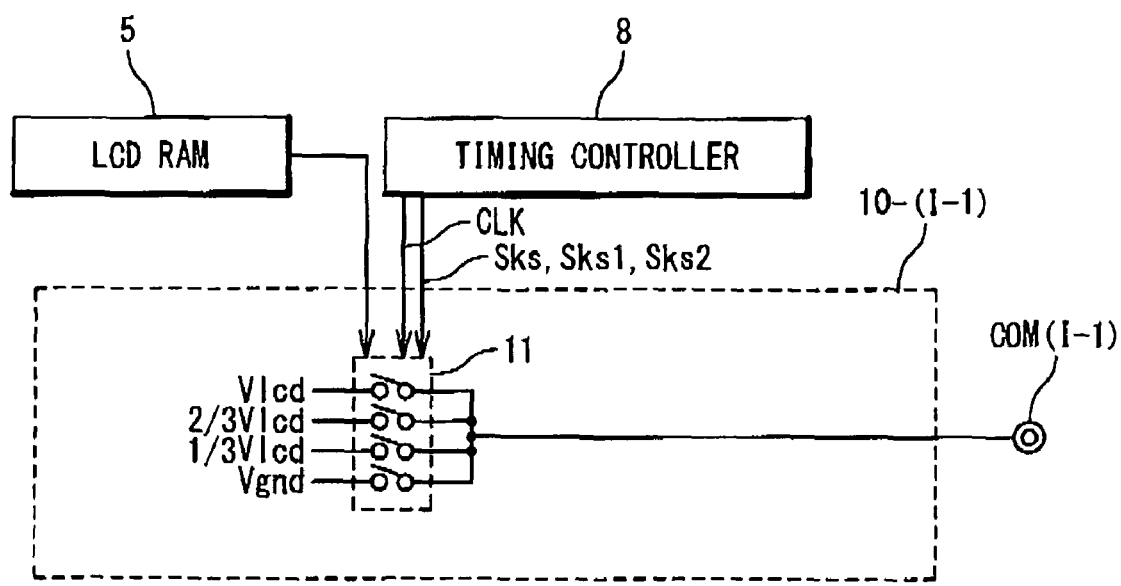
FIG. 5 is a diagram showing one COM control circuit.

The COM control circuits 10-0 to 10-(M−1) will be described taking one example. As shown in FIG. 5, each COM control circuit 10-(I−1) (I is an integer satisfying $1 \leq I \leq M$) is provided with a voltage control circuit 11. The voltage control circuit 11 is provided between a first power supply for generating the maximum value Vlcd of the display drive voltage and a second power supply for generating the minimum value Vgnd of the display drive voltage, and generates the maximum value Vlcd, the intermediate values ⅓Vlcd and ⅔Vlcd, and the minimum value Vgnd. The voltage control circuit 11 is connected to the LCD RAM 5 at its input, and its output is connected to the terminal COM(I−1). Moreover, the voltage control circuit 11 is connected to the timing controller 8, and the voltage control circuit 11 is supplied with the clock signal CLK and the control signals Sks, Sks1, and Sks2 from the timing controller 8.

Figure 6:
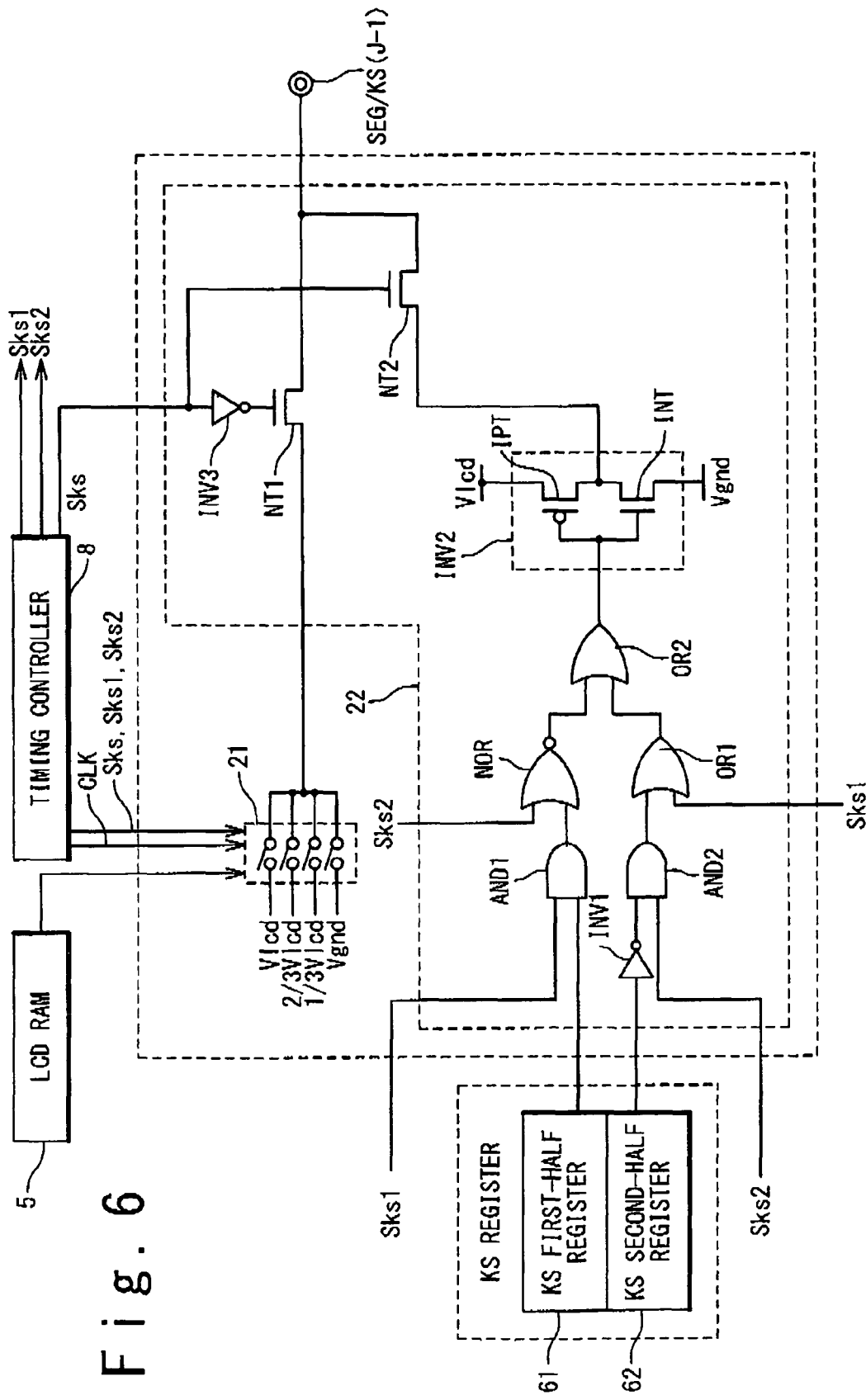
FIG. 6 is a diagram showing one SEG/KS control circuit.

The SEG/KS control circuits 20-0 to 20-(N−1) will be described taking one example. As shown in FIG. 6, each SEG/KS control circuit 20-(J−1) (J is an integer satisfying $1 \leq J \leq N$) is provided with a voltage control circuit 21 and a key scan control circuit 22. The voltage control circuit 21 is provided between the first power supply for generating the maximum value Vlcd of the display drive voltage and the second power supply for generating the minimum value Vgnd of the display drive voltage, and generates the maximum value Vlcd, the intermediate values ⅓Vlcd and ⅔Vlcd, and the minimum value Vgnd. The voltage control circuit 21 is connected to the LCD RAM 5, and its output is connected to the terminal SEG/KS(J−1) through the key scan control circuit 22. Moreover, the voltage control circuit 21 is connected to the timing controller 8 to receive the clock signal CLK and the control signals Sks, Sks1, and Sks2. The key scan control circuit 22 is connected to the KS first-half register 61 and the KS second-half register 62, and its output is connected to the terminal SEG/KS(J−1). Moreover, the key scan control circuit 22 is connected to the timing controller 8 to receive the control signals Sks, Sks1, and Sks2.

The key scan control circuit 22 is provided with inverter circuits INV1 to INV3, AND circuits AND1 and AND2, OR circuits OR1 and OR2, a NOR circuit NOR, and an N-channel MOSFET (hereinafter, to be referred to as an NMOS transistor) NT1 and NT2. The AND circuit AND1 is connected to the KS first-half register 61 and the timing controller 8 to receive the control signal Sks1. The NOR circuit NOR is connected to an output of the AND circuit AND1 and the timing controller 8 to receive the control signal Sks2. The inverter circuit INV1 is connected to the KS second-half register 62. The AND circuit AND2 is connected to the output of the inverter circuit INV1 and the timing controller 8 to receive the control signal Sks2. The OR circuit OR1 is connected to the output of the AND circuit AND2 and the timing controller 8 to receive the control signal Sks1. The OR circuit OR2 is connected to the output of the NOR circuit NOR and the output of the AND circuit AND2. The inverter circuit INV2 is connected to the output of the OR circuit OR2. The inverter circuit INV2 has a P-channel MOSFET (hereinafter, to be referred to as a PMOS transistor) IPT provided between the first power supply and the second power supply and an N-channel MOSFET (hereinafter to be referred to as an NMOS transistor) INT provided between the transistor IPT and the second power supply. The inverter circuit INV3 is connected to the timing controller 8 to receive the control signal Sks. The transistor NT1 is provided between the voltage control circuit 21 and the terminal SEG/KS(J−1), and its gate is connected to the output of the inverter circuit INV3. The transistor NT2 is provided between the output of the inverter circuit INV2 and the terminal SEG/KS(J−1), and it gate is connected to the timing controller 8 to receive the control signal Sks.

The COM control circuits 10-0 to 10-(M−1) and the SEG/KS control circuits 20-0 to 20-(N−1) execute the LCD display output process in response to the control signal Sks "Low" from the timing controller 8.

Figure 7A:
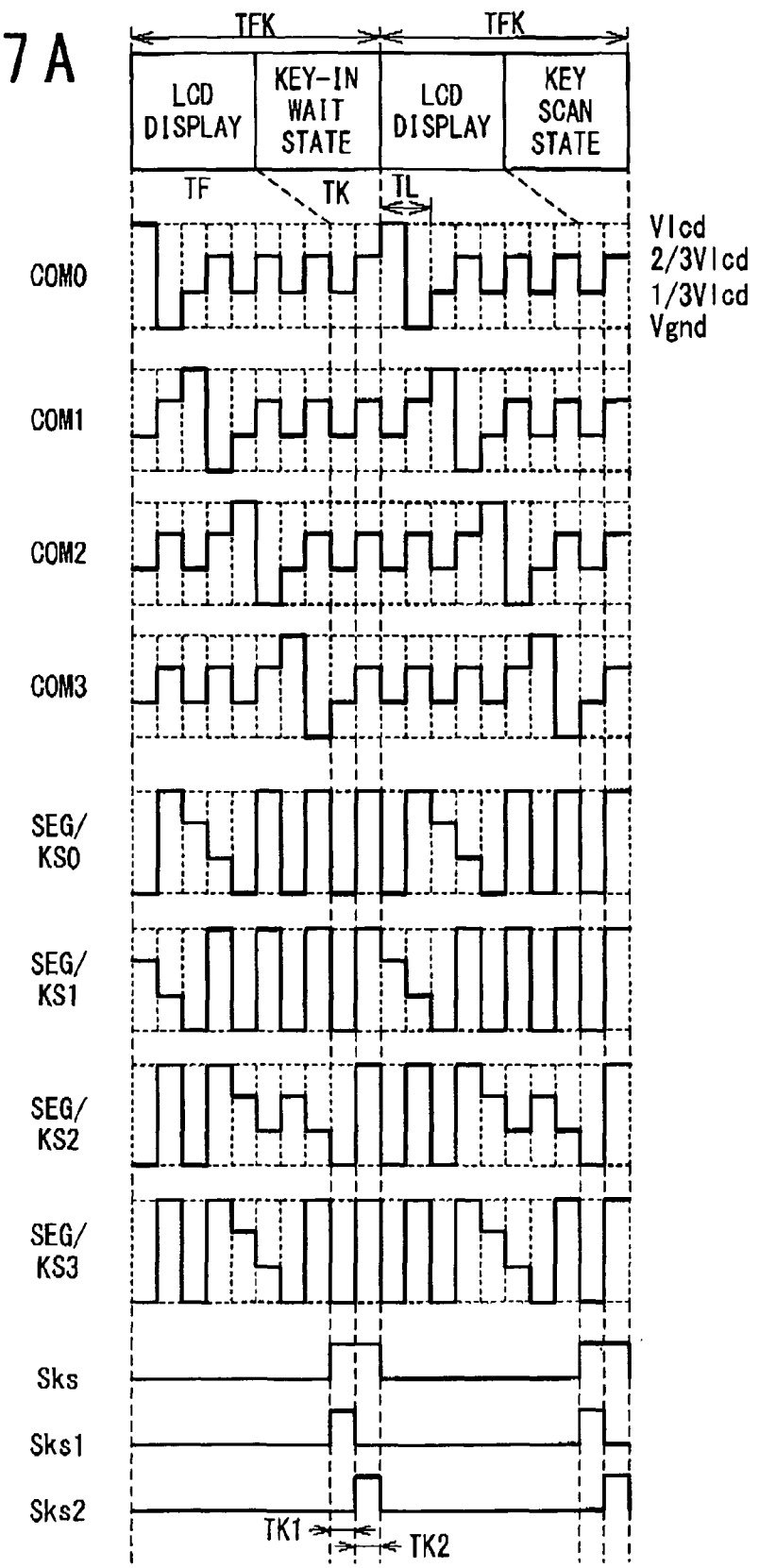
FIG. 7A is diagram showing operations of the LCD controller of the present invention.

In this case, as shown in FIG. 7A, during the LCD display output period, the voltage control circuit 11 of each of the COM control circuits 10-0 to 10-(M−1) outputs a value indicating the common signal to the terminals COM0 to COM(M−1). As described above, the common signal has a display drive voltage indicating the maximum value Vlcd, the minimum value Vgnd, and the intermediate values ⅓Vlcd and ⅔Vlcd. The voltage control circuits 11 of the COM control circuits 10-0 to 10-(M−1) output the maximum value Vlcd of the display drive voltage to the terminals COM0 to COM(M−1) sequentially. Here, the voltage control circuits 11 of the COM control circuits 10-0 to 10-(M−1) output the maximum value Vlcd of the display drive voltage to the terminals COM0 to COM(M−1), as selection levels, and immediately after, output the minimum value Vgnd to the terminals COM0 to COM(M−1), respectively. Moreover, the voltage control circuits 11 of the COM control circuits 10-0 to 10-(M−1) output the intermediate value ⅓Vlcd to the terminals COM0 to COM(M−1) as non-selection levels, and immediately after, output the intermediate value ⅔Vlcd to the terminals COM0 to COM(M−1), respectively.

During the LCD display output period, the voltage control circuits 21 of the SEG/KS control circuits 20-0 to 20-(N−1) read values showing the segment signals from the LCD RAM 5, and output them to the terminals SEG/KS0 to SEG/KS(N−1), respectively. As described above, the segment signal has the display drive voltage indicating the maximum value Vlcd, the minimum value Vgnd and the intermediate values ⅓Vlcd and ⅔Vlcd. The voltage control circuits 21 of the SEG/KS control circuits 20-0 to 20-(N−1) output the minimum value Vgnd of the display drive voltage to the terminals SEG/KS0 to SEG/KS(N−1) as the selection level, respectively, and immediately after, output the maximum value Vlcd to the terminals SEG/KS0 to SEG/KS(N−1), respectively. The LCD controller 9 outputs the intermediate value ⅔Vlcd to the respective terminals SEG/KS0 to SEG/KS(N−1) as the non-selection level, and immediately after, outputs the intermediate value ⅓Vlcd to the respective terminals SEG/KS0 to SEG/KS(N−1).

Here, it is supposed that a common voltage indicating values (Vlcd, Vgnd) (⅓Vlcd, ⅔Vlcd) supplied to the terminals COM0 to COM(M−1) during the unit time TL is Vcom. Similarly, it is supposed that a segment voltage indicating values (Vlcd, Vgnd) (⅓Vlcd, ⅔Vlcd) supplied to the terminals SEG/KS0 to SEG/KS(N−1) during the unit time TL is Vseg. In this case, the relation shown in the above-mentioned the equation 1 is satisfied in the unit time TL. Thus, charge remaining between the electrodes of the LCD panel 100 is negated.

When the maximum value Vlcd of the display drive voltage is supplied to the terminal COM(I−1) (I is an integer satisfying 1≦I≦M) as the selection level, the back electrode corresponding to the terminal COM(I−1) is selected from among the M back electrodes of the LCD panel 100. When the minimum value Vgnd of the display drive voltage is supplied to the terminal SEG/KS(J−1) (J is an integer satisfying 1≦J≦N) as the segment signal, the front electrode corresponding to the terminal SEG/KS(J−1) is selected from among the N front electrodes of the LCD panel 100. Then, when at the same time, the back electrode corresponding to the terminal COM(I−1) and the front electrode corresponding to the terminal SEG/KS(J−1) are selected, display data corresponding to the common signal and the segment signal is displayed by using the back electrode and the front electrode. In the other cases, the display data is not displayed.

The COM control circuits 10-0 to 10-(M−1) and the SEG/KS control circuits 20-0 to 20-(N−1) execute the KS output process in response to the control signal Sks "High" from the timing controller 8.

Here, it is assumed that the KS first-half register 61 and the KS second-half register 62 have not held the first key scan pulse signal and the second key scan pulse signal, respectively. In this case, they are in the key-in wait state.

As shown in FIG. 7A, the voltage control circuits 11 of the COM control circuits 10-0 to 10-(M−1) output values expressing the first non-display signal and the second non-display signal to the terminals COM0 to COM(M−1) during the KS output period in the key-in wait state. For example, the first non-display signal and the second non-display signal show the intermediate value ⅓Vlcd and the intermediate value ⅔Vlcd of the display drive voltage, respectively. The voltage control circuits 11 of the COM control circuits 10-0 to 10-(M−1) output the intermediate value ⅓Vlcd of the display drive voltage to the terminals COM0 to COM(M−1) during the KS first-half output period in response to the control signals Sks1 "High" and Sks2 "Low". Then, the voltage control circuits 11 of the COM control circuits 10-0 to 10-(M−1) output the intermediate value ⅔Vlcd of the display drive voltage to the terminals COM0 to COM(M−1) during the KS second-half output period in response to the control signals Sks1 "Low" and Sks2 "High".

In the key-in wait state, the key scan control circuits 22 of the SEG/KS control circuits 20-0 to 20-(N−1) read values indicating the first key-in wait signal and the second key-in wait signal from the LCD RAM 5 and output them to the terminals SEG/KS0 to SEG/KS(N−1). For example, the first key-in wait signal and the second key-in wait signal indicate the minimum value Vgnd and the maximum value Vlcd of the display drive voltage, respectively. The key scan control circuits 22 of the SEG/KS control circuits 20-0 to 20-(N−1) output the minimum value Vgnd of the display drive voltage to the terminals SEG/KS0 to SEG/KS(N−1) in response to the control signals Sks1 "High" and Sks2 "Low" during the KS first-half output period. Then, the key scan control circuits 22 of the SEG/KS control circuits 20-0 to 20-(N−1) output the maximum value Vlcd of the display drive voltage to the terminal SEG/KS0 to SEG/KS(N−1) in response to the control signals Sks1 "Low" and Sks2 "High" during the KS second-half output period. By opposite values (the maximum value Vlcd and the minimum value Vgnd) being supplied to the terminals SEG/KS0 to SEG/KS(N−1) during the unit time TL, the charge remaining in the front electrodes of the LCD panel 100 is negated.

It is supposed that common voltages indicating values (⅓Vlcd, ⅔Vlcd) supplied to the terminals COM0 to COM(M−1) during the unit time TL are Vcom, and segment voltages indicating values (Vlcd, Vgnd) supplied to the terminals SEG/KS0 to SEG/KS(N−1) during the unit time TL are Vseg. In this case, in the KS output period (unit time TL), the relation shown by the above-mentioned equation (1) is satisfied. Thus, the charge remaining between the electrodes of the LCD panel 100 is negated.

Moreover, when the intermediate value ⅓Vlcd is made to be not displayed at the ⅓ bias, in the key-in wait state, the first non-display signal (the intermediate value ⅓Vlcd) is outputted for the first key-in wait signal (the minimum value Vgnd) during the KS first-half output period of the KS output period, and the second non-display signal (the intermediate value ⅔Vlcd) is outputted for the second key-in wait signal (the maximum value Vlcd) during the KS second-half output period. Thus, a relation of |Vcom−Vseg|=⅓ (non-display) is satisfied in the KS output period (unit time TL).

It is assumed that anyone of the keys of the key matrix 200 is operated. In this case, the interrupt generating circuit 40 generates the interrupt signal. Upon generation of this interrupt signal, the CPU 2 performs the key scan process (the key scan state). In the key scan state, the CPU 2, stores values showing the first key scan pulse signal and the second key scan pulse signal in the KS first-half register 61 and in the KS second-half register 62, respectively.

Figure 7B:
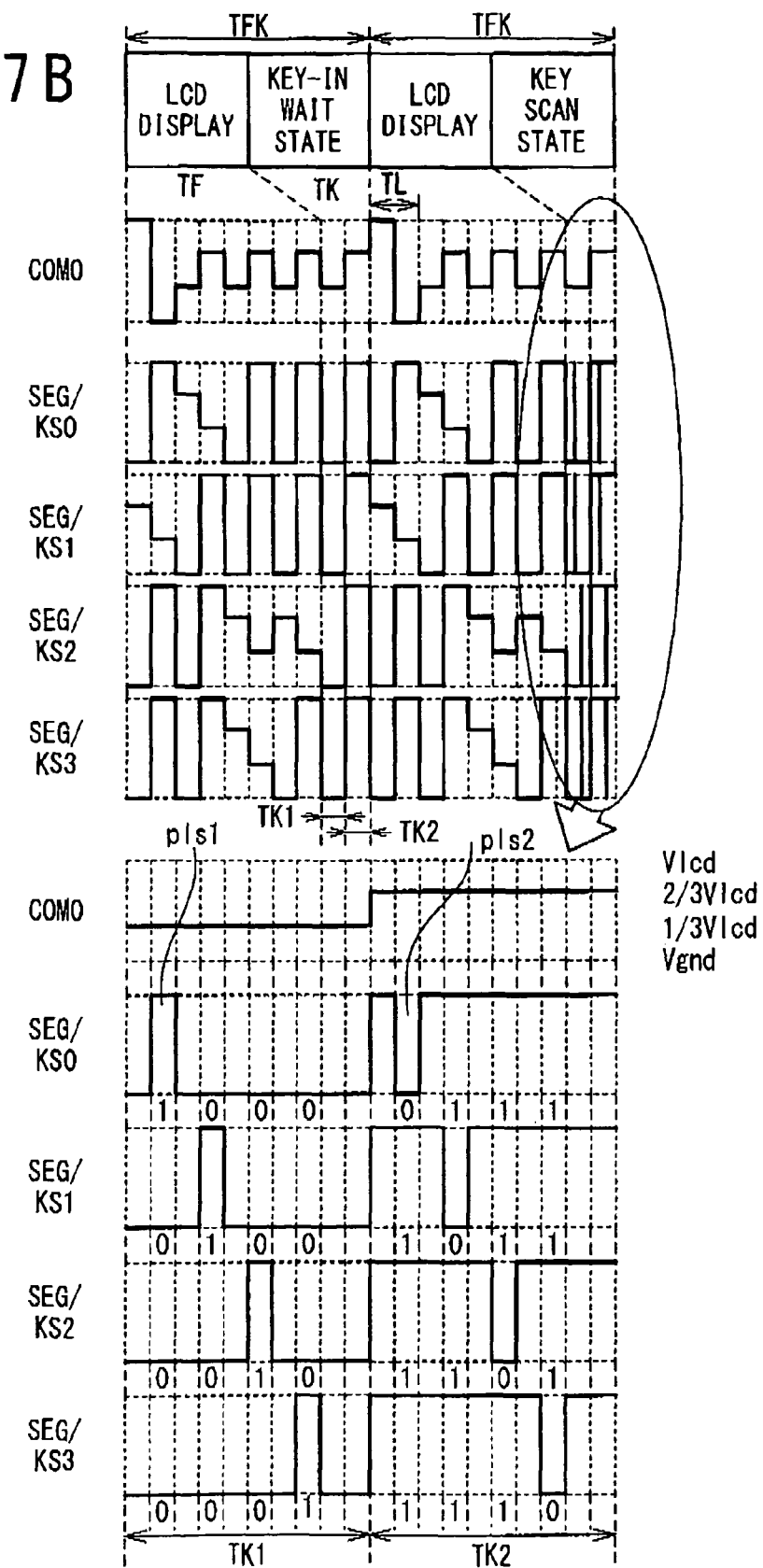
FIG. 7B is a diagram showing operations of the LCD controller of the present invention.

As shown in FIG. 7B, the key scan control circuits 22 of the SEG/KS control circuits 20-0 to 20-(N−1) read values indicating the first key scan pulse signal and the second key scan pulse signal from the KS first-half register 61 and the KS second-half register 62 in the key scan state during the KS output period, and output them to the terminals SEG/KS0 to SEG/KS(N−1), respectively. The first key scan pulse signal and the second key scan pulse signal are referred to as a first key scan pulse signal pls1 and a second key scan pulse signal pls2, respectively. As described above, the first key scan pulse signal pls1 varies between the maximum value Vlcd and the minimum value Vgnd of the display drive voltage, and the second key scan pulse signal pls2 is an inversion signal of the first key scan pulse signal pls1. For example, it is assumed that the peak values shown by the first key scan pulse signal pls1 and the second key scan pulse signal pls2 are the maximum value Vlcd and the minimum value Vgnd of the display drive voltage, respectively. The key scan control circuits 22 of the SEG/KS control circuits 20-0 to 20-(N−1) output the maximum value Vlcd of the display drive voltage to the terminals SEG/KS0 to SEG/KS(N−1) at respective different timings during the KS first-half output period in response to the control signals Sks1 "High" and Sks2 "Low". After that, the key scan control circuits 22 of the SEG/KS control circuits 20-0 to 20-(N−1) output the minimum value Vgnd of the display drive voltage to the terminals SEG/KS0 to SEG/KS(N−1) at respective different timings during the KS second-half output period in response to the control signals Sks1 "Low" and Sks2 "High". By outputting the opposite values (the maximum value Vlcd and the minimum value Vgnd) to the terminals SEG/KS0 to SEG/KS(N−1) in the unit time TL, the charge remaining in the front electrodes of the LCD panel 100 is negated.

Here, it is supposed that during the unit time TL, the common voltages indicating values (⅓Vlcd, ⅔Vlcd) supplied to the terminals COM0 to COM(M−1) are Vcom, and during the unit time TL, the segment voltages indicating values (Vlcd, Vgnd) supplied to the terminals SEG/KS0 to SEG/KS(N−1) are Vseg. In this case, a relation shown in the above-mentioned equation (1) is satisfied in the KS output period (unit time TL). Thus, the charge remaining between the electrodes of the LCD panel 100 is negated.

Moreover, when the intermediate value ⅓Vlcd is made to be not displayed at the ⅓ bias, the first non-display signal (the intermediate value ⅓Vlcd) is outputted to the first key scan pulse signal pls1 (the peak value shows the maximum value Vlcd and any values other than it show the minimum value Vgnd) during the KS first-half output period of the KS output period in the key scan state, and the second non-display signal (the intermediate value ⅔Vlcd) is outputted to the second key scan pulse signal pls2 (the peak value shows the minimum value Vgnd and any values other than it show the maximum value Vlcd) during the KS second-half output period. In this case, when the first key scan pulse signal pls1 and the second key scan pulse signal pls2 are outputted, a relation of |Vcom−Vseg|=⅔ is met. However, only when the user operates the key, a shift from the key-in wait state to the key scan state occurs. Thus, since in the key scan state, the key scan process needs to be executed only once or only several times after the key of the key matrix 200 is operated, almost all states is the key-in wait state. That is, in almost all states, the relation of |Vcom−Vseg|=⅓ in the key-in wait state is satisfied.

The timings at which the first key scan pulse signal and the second key scan pulse signal are outputted will be described in detail.

For example, it is assumed that a time TK1 corresponding to the KS first-half output period of the KS output period and a time TK2 corresponding to the KS second-half output period are each divided by ten. In this case, the KS first-half output period and the KS second-half output period are each expressed by times TK1 (1/10) to TK1 (10/10) and times TK2 (1/10) to TK2 (10/10), respectively. For example, it is assumed that when the time is even number (2/10, 4/10, . . . ), the first key scan pulse signal and the second key scan pulse signal are outputted. At this time, the key scan control circuits 22 of the SEG/KS control circuits 20-0 to 20-(N−1) sequentially output the maximum value Vlcd of the display drive voltage, as the first to $N^{th}$ values to the terminals SEG/KS0 to SEG/KS(N−1) during the KS first-half output period, and output the minimum value Vgnd of the display drive voltage, as the first to $N^{th}$ values to the terminals SEG/KS0 to SEG/KS(N−1) in this order during the KS second-half output period. Moreover, the above-mentioned N is assumed to be four.

First, in the key scan state, at times TK1 (1/10) (3/10) (5/10) (7/10) (9/10) (10/10) of the KS first-half output period, the CPU 2 stores a data stream showing data "0, 0, 0, 0" in the KS first-half register 61. The data "0" indicates the minimum value Vgnd of the display drive voltage. At this time, the key scan control circuits 22 of the SEG/KS control circuits 20-0 to 20-3 read the data stream "0, 0, 0, 0" from the KS first-half register 61, and output the minimum value Vgnd of the display drive voltage to the terminals SEG/KS0 to SEG/KS3.

At a time TK1 (2/10) of the KS first-half output period, the CPU 2 stores a data stream indicating data "1, 0, 0, 0" in the KS first-half register 61. The data "1" indicates the maximum value Vlcd of the display drive voltage, and corresponds to the first key scan pulse signal pls1. At this time, the key scan control circuits 22 of the SEG/KS control circuits 20-0 to 20-3 read the data stream "1, 0, 0, 0" from the KS first-half register 61, and output the maximum value Vlcd, the minimum value Vgnd, the minimum value Vgnd, and the minimum value Vgnd of the display drive voltage to the respective terminals SEG/KS0 to SEG/KS3.

At a time TK1 (4/10) of the KS-first-half output period, the CPU 2 stores a data stream showing data "0, 1, 0, 0" in the KS first-half register 61. At this time, the key scan control circuit 22 of the SEG/KS control circuits 20-0 to 20-3 reads the data stream "0, 1, 0, 0" from the KS first-half register 61, and outputs the minimum value Vgnd, the maximum value Vlcd, the minimum value Vgnd, and the minimum value Vgnd of the display drive voltage to the respective terminals SEG/KS0 to SEG/KS3.

At a time TK1 (6/10) of the KS first-half output period, the CPU 2 stores a data stream indicating the data "0, 0, 1, 0" in the KS first-half register 61. At this time, the key scan control circuits 22 of the SEG/KS control circuits 20-0 to 20-3 read the data stream "0, 0, 1, 0" from the KS first-half register 61, and output the minimum value Vgnd, the minimum value Vgnd, the maximum value Vlcd, and the minimum value Vgnd of the display drive voltage to the respective terminals SEG/KS0 to SEG/KS3.

At a time TK1 (8/10) of the KS first-half output period, the CPU 2 stores a data stream showing data "0, 0, 0, 1" in the KS first-half register 61. At this time, the key scan control circuit 22 of the SEG/KS control circuits 20-0 to 20-3 reads the data stream "0, 0, 0, 1" from the KS first-half register 61, and outputs the minimum value Vgnd, the minimum value Vgnd, the minimum value Vgnd, and the maximum value Vlcd of the display drive voltage to the respective terminals SEG/KS0 to SEG/KS3.

Next, at times TK2 (1/10) (3/10) (5/10) (7/10) (9/10) (10/10) of the KS second-half output period, the CPU 2 stores a data stream indicating data "1, 1, 1, 1" in the KS second-half register 62. At this time, the key scan control circuits 22 of the SEG/KS control circuits 20-0 to 20-3 read the data stream "1, 1, 1, 1" from the KS second-half register 62, and outputs the maximum value Vlcd of the display drive voltage to the terminals SEG/KS0 to SEG/KS3.

At a time TK2 (2/10) of the KS second-half output period, the CPU 2 stores a data stream showing data "0, 1, 1, 1" in the second-half KS register 62. Data "0" corresponds to the second key scan pulse signal pls2. At this time, the key scan control circuits 22 of the SEG/KS control circuits 20-0 to 20-3 read the data stream "0, 1, 1, 1" from the KS second-half register 62, and output the minimum value Vgnd, the maximum value Vlcd, the maximum value Vlcd, and the maximum value Vlcd of the display drive voltage to the respective terminals SEG/KS0 to SEG/KS3.

At a time TK2 (4/10) of the KS second-half output period, the CPU 2 stores a data stream indicating data "1, 0, 1, 1" in the KS second-half register 62. At this time, the key scan control circuits 22 of the SEG/KS control circuits 20-0 to 20-3 read the data stream "1, 0, 1, 1" from the KS second-half register 62, and output the maximum value Vlcd, the minimum value Vgnd, the maximum value Vlcd, and the maximum value Vlcd of the display drive voltage to the respective terminals SEG/KS0 to SEG/KS3.

At a time TK2 (6/10) of the KS second-half output period, the CPU 2 stores a data stream showing data "1, 1, 0, 1" in the KS second-half register 62. At this time, the key scan control circuits 22 of the SEG/KS control circuits 20-0 to 20-3 reads the data stream "1, 1, 0, 1" from the KS second-half register 62, and output the maximum value Vlcd, the maximum value Vlcd, the minimum value Vgnd, and the maximum value Vlcd of the display drive voltage to the respective terminals SEG/KS0 to SEG/KS3.

In a time TK2 (8/10) of the KS second-half output period, the CPU 2 stores a data stream indicating data "1, 1, 1, 0" in the KS second-half register 62. At this time, the key scan control circuits 22 of the SEG/KS control circuits 20-0 to 20-3 reads the data stream "1, 1, 1, 0" from the KS second-half register 62, and outputs the maximum value Vlcd, the maximum value Vlcd, the maximum value Vlcd, and the minimum value Vgnd of the display drive voltage to the respective terminals SEG/KS0 to SEG/KS3.

Next, the key scan will be described.

The key matrix 200 further has an N-channel MOSFET that, when the key of the $i^{th}$ row and the $j^{th}$ column (i is an integer satisfying $1 \leq i \leq m$, and j is an integer satisfying $1 \leq j \leq n$) is operated, turns on and connects the terminal KR(i−1) and the terminal SEG/KS(j−1). The terminal SEG/KS(j−1) is used as an N-channel open drain so that even when the keys are operated simultaneously, it does not cause a problem. When the key of the $i^{th}$ row and the $j^{th}$ column is operated, if the minimum value Vgnd of the display drive voltage is supplied to the terminal SEG/KS(j−1) during the KS output period Tks; the terminal KR(i−1) is supplied with the minimum value Vgnd.

Figure 8:
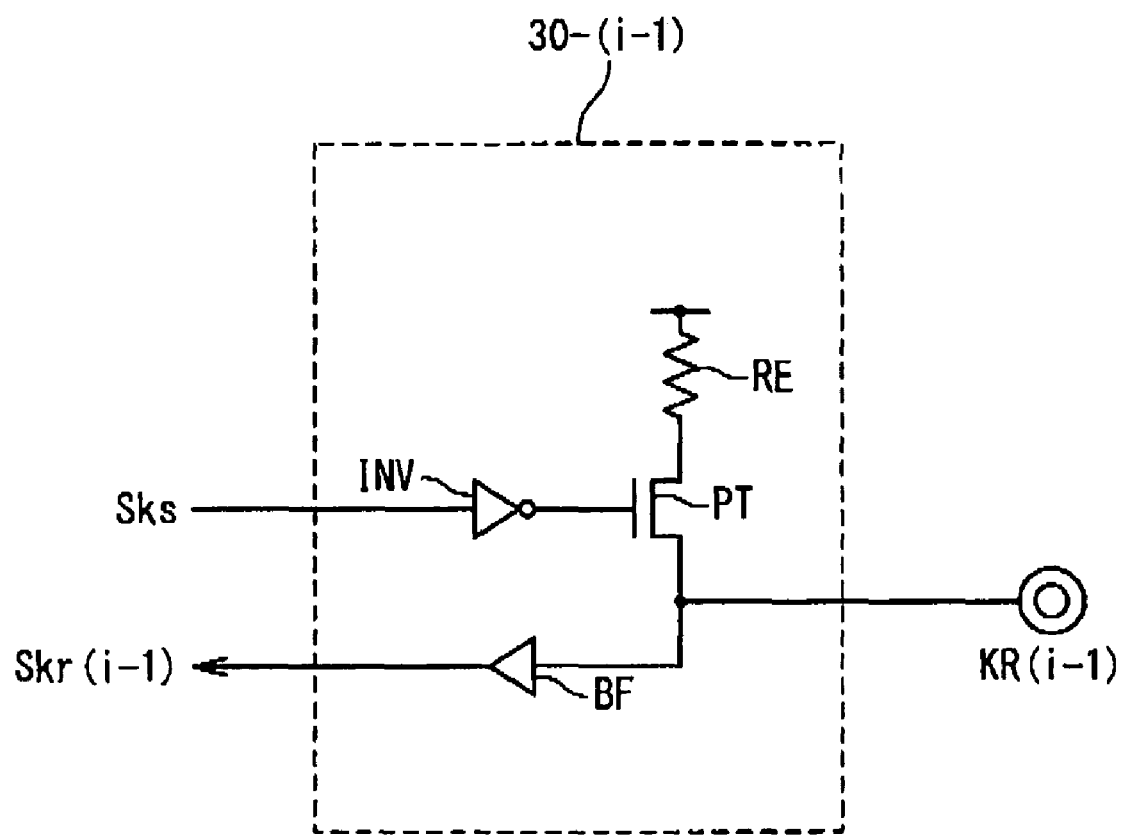
FIG. 8 is a diagram showing one KR input circuit.

The KR input circuits 30-0 to 30-(M−1) will be described by taking an example. As shown in FIG. 8, the KR input circuit 30-(i−1) is provided with a resistance element RE, a P-channel MOSFET (hereinafter, to be referred to as a transistor) PT, an inverter circuit INV, and a buffer BF. The resistance element RE is connected to the first power supply for generating the maximum value Vlcd of the display drive voltage, and the other end thereof is connected to the source of the transistor PT. The gate of the transistor PT is connected to an output of the inverter circuit INV. The control signal Sks from the timing controller 8 is supplied to an input of the inverter circuit INV. In this case, the control signal Sks is supplied to the inverter circuit INV while considering a delay by wiring from the LCD control circuit 7 to the KR input circuit 30-(i−1). The buffer BF is connected to the drain of the transistor PT and the terminal KR(i−1) at its input, and outputs a monitor signal Skr(i−1) as its output to the interrupt generating circuit 40.

Figure 9:
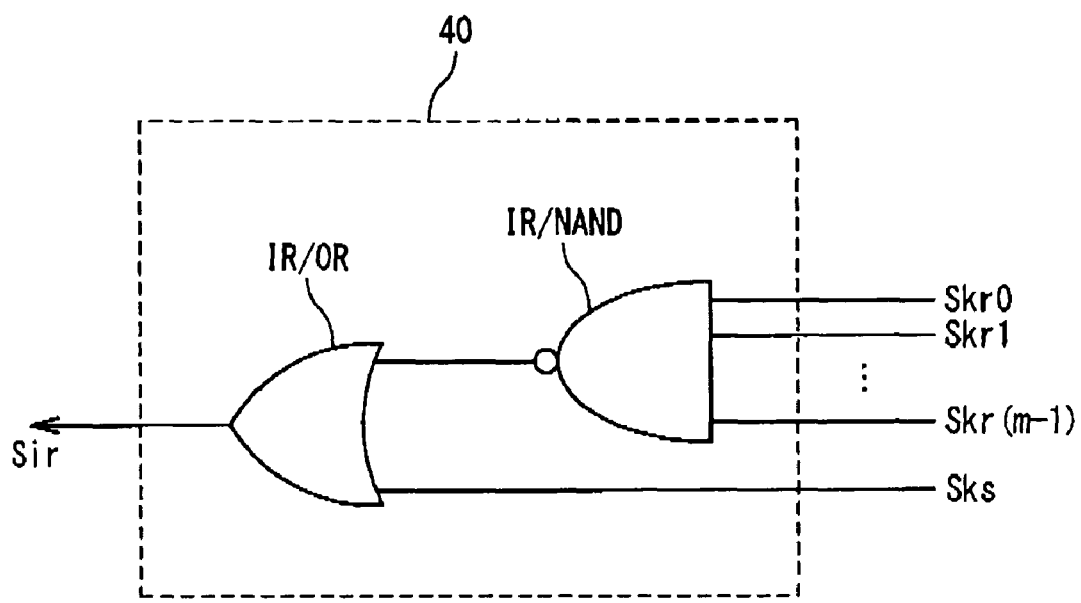
FIG. 9 is a diagram showing one interrupt generating circuit 40.

The interrupt generating circuit 40 will be described taking one example. As shown in FIG. 9, the interrupt generating circuit 40 is provided with a NAND circuit IR/NAND and an OR circuit IR/OR. The NAND circuit IR/NAND is connected to the KR input circuits 30-0 to 30-(m−1), and is supplied with the monitor signals Skr0 to Skr(i−1) from the KR input circuits 30-0 to 30-(m−1). The OR circuit IR/OR is connected to an output of the NAND circuit IR/NAND. The OR circuit IR/OR is supplied with the control Sks1 from the timing controller 8. In this case, the control signal Sks1 is supplied to the OR circuit IR/OR while considering a delay by a wiring from the LCD control circuit 7 to the KR input circuit 30-(i−1). The OR circuit IR/OR outputs the interrupt signal Sir to the CPU 2 through the internal bus 50.

During the KS output period, in order to turn on the transistor PT, the maximum value Vlcd "1" of the display drive voltage is supplied to the terminals KR0 to KR(M−1), and the KR input circuits 30-0 to 30-(M−1) output the monitor signals Skr0 to Skr(i−1) indicating the maximum value Vlcd "1". In this case, the interrupt generating circuit 40 sets the signal level of the interrupt signal Sir to the low level "Low."

When the user operates the key of the $i^{th}$ row and the $j^{th}$ column, if the minimum value Vgnd "0" of the display drive voltage is supplied to the terminal SEG/KS(j−1) during the KS output period; the terminal KR(i−1) is supplied with the minimum value Vgnd "0." In this case, the interrupt generating circuit 40 sets the signal level of the interrupt signal Sir to the high level "High." That is, an interrupt occurs.

Figure 10:
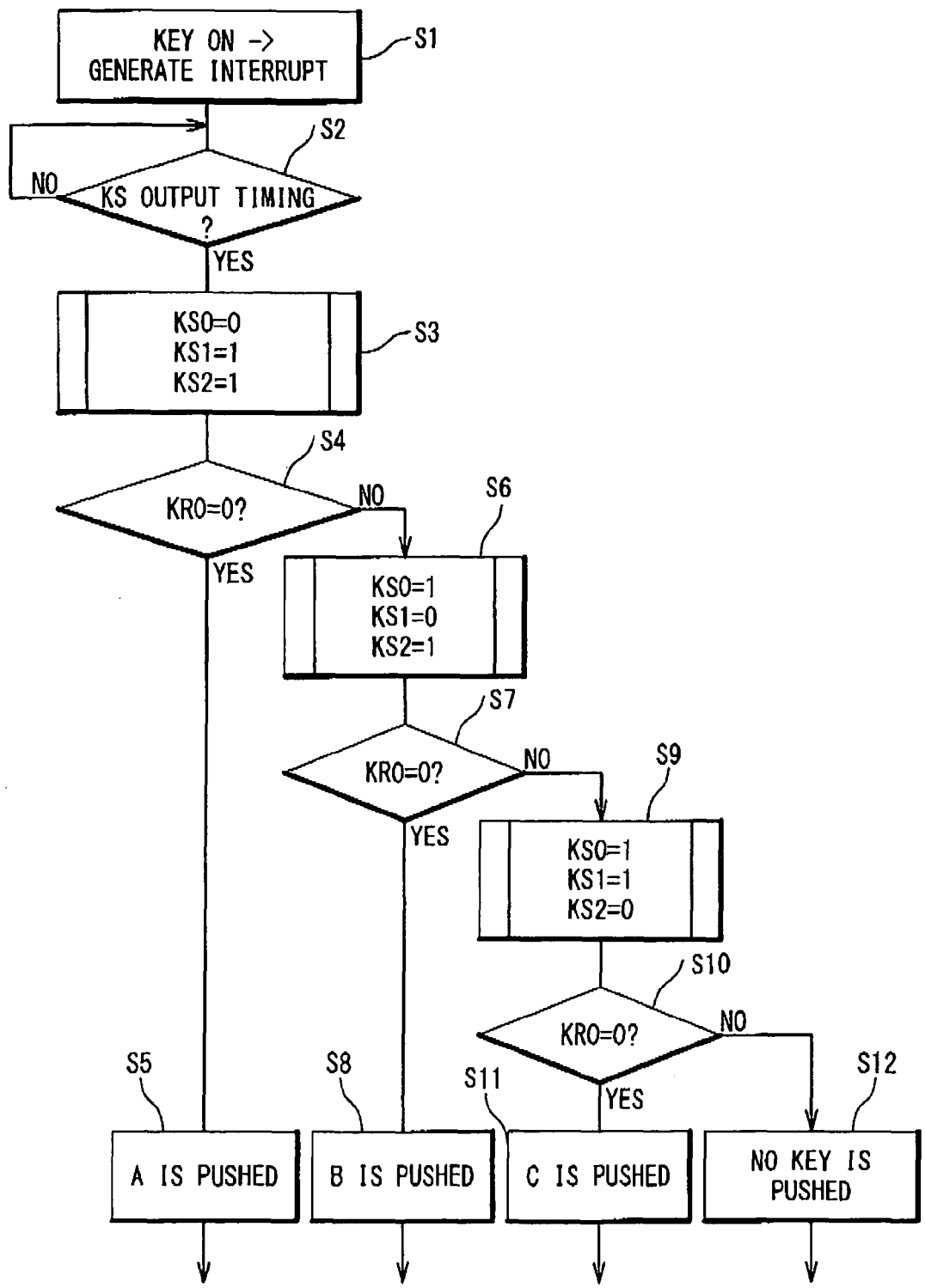
FIG. 10 is a diagram showing an operation of the LCD controller driver of the present invention in the key scan state.

As shown in FIG. 10, when the interrupt occurs (Step S1), the CPU 2 discriminates the key of the $i^{th}$ row and the $j^{th}$ column during the KS second-half output period in the key scan state (Step S2—YES).

It is assumed that the keys of the matrix with m rows and n columns are keys of a matrix with three rows and three columns, and the first, the second, and the third row of the first, the second, and the third column are designated as buttons A to C, buttons D to F, and buttons G to I, respectively. In this case, in the key scan state, the first determination is done as follows: when the key scan control circuits 22 of the SEG/KS control circuits 20-0 to 20-2 output the minimum value Vgnd "0," the maximum value Vlcd "1," and the maximum value Vlcd "1" of the display drive voltage to the respective terminals SEG/KS0 to SEG/KS2 (Step S3), if the minimum value Vgnd "0" is supplied to the terminal KR0 (Step S4—YES); the CPU 2 determines that the button A has been operated (Step S5). The second determination is done as follows: when the key scan control circuits 22 of the SEG/KS control circuits 20-0 to 20-2 output the maximum value Vlcd "1," the minimum value Vgnd "0," and the maximum value Vlcd "1" to the respective terminals KS0 to KS2 (Steps S3, S4—NO, and S6), if the minimum value Vgnd "0" is supplied to the terminal KR0 (Step S7—YES); the CPU 2 determines that the button B has been operated (Step S8). The third determination is done as follows: when the key scan control circuit 22 of the SEG/KS control circuits 20-0 to 20-2 outputs the maximum value Vlcd "1," the maximum value Vlcd "1," and the minimum value Vgnd "0" of the display drive voltage to the respective terminals KS0 to KS2 (Steps S3, S4—NO, S6, S7—NO, and S9), if the minimum value Vgnd "0" is supplied to the terminal KR0 (Step S10—YES); the CPU 2 determines that the button C has been operated (Step 311). The fourth determination is done as follows: when the CPU 2 determines that the buttons A to C are not operated (Step S110), the KR input circuit 30-1 performs Steps 33 to S12 for the buttons D to F, and the KR input circuit 30-2 performs Steps 33 to S12 for the buttons G to I.

As it would be evident from the above description, in the LCD controller 9 of the present invention, in the key scan state, the SEG/KS control circuits 20-0 to 20-(N−1) output the first key scan pulse signals pls1 (the peak value indicates the maximum value Vlcd and any values other than it indicate the minimum value Vgnd) to the terminals SEG/KS0 to SEG/KS(N−1) at respective different timings during the KS first-half output period of the KS output period, and output the second key scan pulse signals pls2 (the peak value indicates the minimum value Vgnd and any values other than it indicate the maximum value Vlcd) to the terminals SEG/KS0 to SEG/KS(N−1) at respective different timings during the KS second-half output period.

When the microcomputer 1 discriminates the key operated by the user using the second key scan pulse signal pls2, the LCD controller 9 supplies the second key scan pulse signal pls2 to the key matrix 200 through the terminals SEG/KS0 to SEG/KS(N−1) at respective different timings during the KS second-half output period. In this case, the second key scan pulse signal pls2 is also supplied to the LCD panel 100 from the terminals SEG/KS0 to SEG/KS(N−1). In doing this, the LCD controller 9 of the present invention supplies the first key scan pulse signal pls1 to the key matrix 200 and the LCD panel 100 through the terminals SEG/KS0 to SEG/KS(N−1) at respective different timings during the KS first-half output period. In this way, the LCD controller 9 of the present invention supplies the opposite values (the maximum value Vlcd and the minimum value Vgnd) to the LCD panel 100 in the unit time TL during the KS output period in the key scan state, whereby it can negate charge remaining in the front electrodes of the LCD panel 100.

Moreover, the LCD controller 9 of the present invention outputs the first key scan pulse signal pls1 and the second key scan pulse signal pls2 to the terminals SEG/KS0 to SEG/KS(N−1) during the KS output period of one frame in the key scan state. For this reason, the LCD controller 9 of the present invention can shorten a time required to discriminate the key operated by the user largely compared to a system of performing key scan using 2N frames as in the conventional LCD controller (a microcomputer 300).

Furthermore, in the LCD controller 9 of the present invention, m voltage comparator circuits as in the conventional LCD controller (the microcomputer 300) are unnecessary.

Still moreover, in the LCD controller 9 of the present invention, in the key-in wait state, the SEG/KS control circuits 20-0 to 20-(N−1) output the first key-in wait signals (showing the minimum value Vgnd) to the respective terminals SEG/KS0 to SEG/KS(N−1) during the KS first-half output period of the KS output period, and output the second key-in wait signal (showing the maximum value Vlcd) to the respective terminals SEG/KS0 to SEG/KS(N−1) in the second-half output period. The LCD controller 9 of the present invention can negate the charge remaining in the front electrodes of the LCD panel 100 by supplying the opposite values (the maximum value Vlcd and the minimum value Vgnd) to the terminals SEG/KS0 to SEG/KS(N−1) during the unit time TL in the KS output period in the key-in wait state.

In addition, in the LCD controller 9 of the present invention, the COM control circuits 10-0 to 10-(M−1) output the first non-display signals (indicating the intermediate value ⅓Vlcd) to the respective terminals COM0 to COM(M−1) during the KS first-half output period of the KS output period, and output the second non-display signals (indicating the intermediate value ⅔Vlcd) to the respective terminals COM0 to COM(M−1) during the KS second-half output period. Therefore, in the LCD controller 9 of the present invention, a relation shown by the above-mentioned equation (1) is satisfied in the KS output period (unit time TL) in the key-in wait state and in the key scan state, when the common voltages indicating the values supplied to the terminals COM0 to COM(M−1) during the unit time TL are Vcom and the segment voltages indicating voltage values supplied to the terminals SEG/KS0 to SEG/KS(N−1) during the unit time TL is designated by Vseg. Thus, the charge remaining between the electrodes of the LCD panel 100 can be negated.

Moreover, when the intermediate value ⅓Vlcd is made to be not displayed at the ⅓ bias, the LCD controller 9 of the present invention outputs the first non-display signal (intermediate value ⅓Vlcd) to the first key-in wait signal (the minimum value Vgnd) during the KS first-half output period of the KS output period in the key-in wait state, and outputs the second non-display signal (intermediate value ⅔Vlcd) to the second key-in wait signal (the maximum value Vlcd) during the KS second-half output period. Thus, in the LCD controller 9 of the present invention, the relation of |Vcom−Vseg|=⅓ (non-display) is satisfied during the KS first-half output period and the KS second-half output period (time: ½TL).

Here, in the key scan state, the LCD controller 9 of the present invention outputs the first non-display signal (the intermediate value ⅓Vlcd) to the first key scan pulse signal pls1 (its peak value indicates the maximum value Vlcd and any values other than it indicate the minimum value Vgnd) during the KS first-half output period of the KS output period, and outputs the second non-display signal (the intermediate value ⅔Vlcd) to the second key scan pulse signal pls2 (its peak value indicates the minimum value Vgnd and any values other than it indicate the maximum value Vlcd) during the KS second-half output period. At this time, the relation of |Vcom−Vseg|=⅔ is satisfied, only when the user operates the key, a shift from the key-in wait state to the key scan state is done. Thus, in the LCD controller 9 of the present invention, since in the key scan state, the key scan process needs to be executed only once or only several times after the key of the key matrix 200 is operated, almost all states is the key-in wait state. That is, in almost all states, the relation of |Vcom−Vseg|=⅓ (non-display) in the key-in wait state is satisfied.

It should be noted that in the present invention, although the ⅓ bias has been described, the same effect is attained with ¼ bias and other biases.

Furthermore, according to the present invention, for example, if N is set to X times the above-mentioned N (N=N× X) (X is an integer satisfying X<N), the following is also possible: the SEG/KS control circuits 20-0 to 20-(N−1) output the first key scan pulse signal pls1 over X periods during the KS first-half output period of the KS output period in the key scan state, and output the second key scan pulse signal pls2 during the KS second-half output period.

Figure 11:
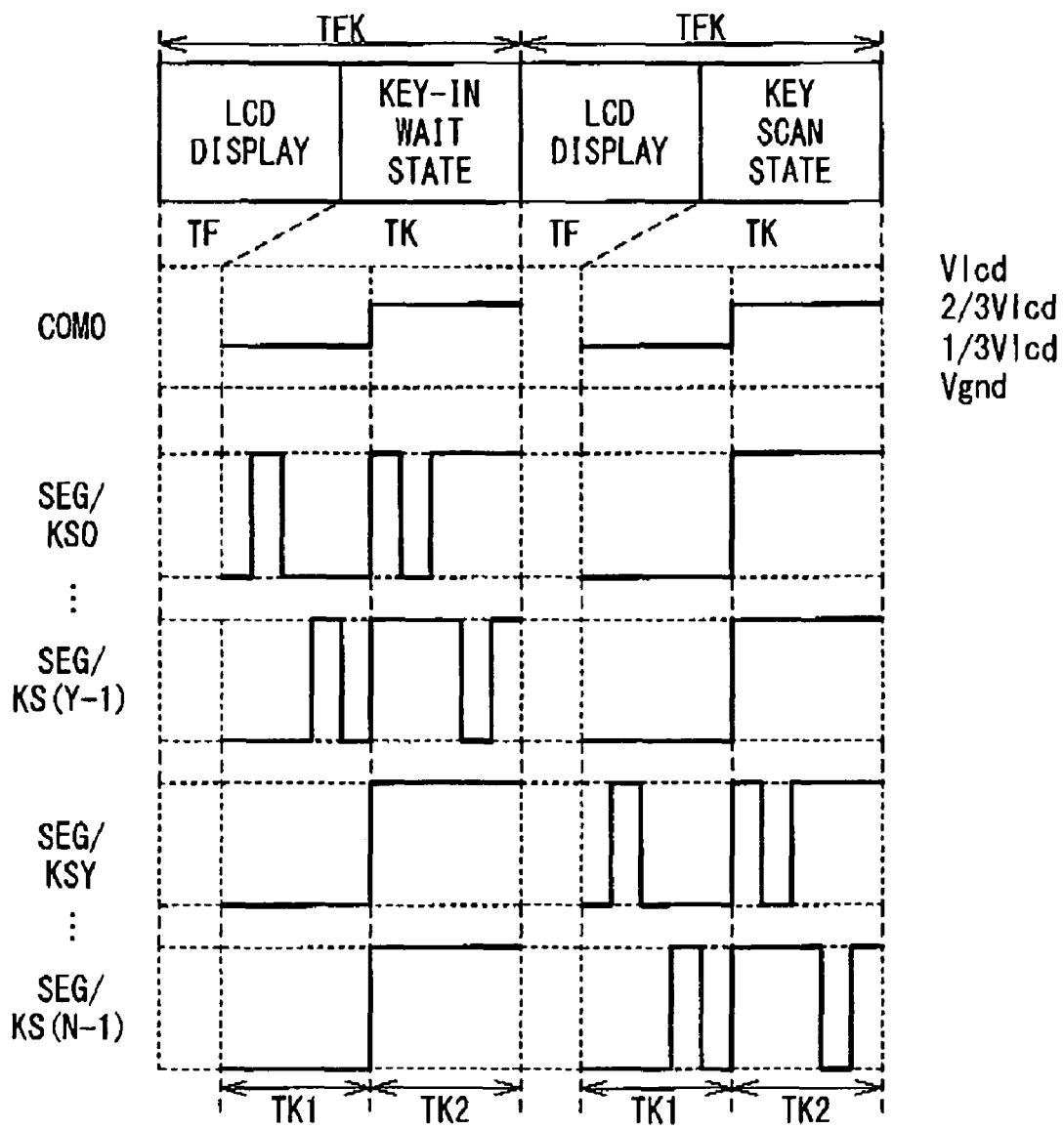
FIG. 11 is a diagram showing other operations of the LCD controller of the present invention.

As shown in FIG. 11, when X is 2, the SEG/KS control circuits 20-0 to 20-(Y−1) (Y is an integer satisfying 2<Y< (N−1)) of the SEG/KS control circuits 20-0 to 20-(N−1) output the first key scan pulse signals pls1 to the terminals SEG/KS0 to SEG/KS(Y−1) at respective different timings during the KS first-half output period of the first frame in the key scan state, and output the second key scan pulse signals pls2 to the terminals SEG/KS0 to SEG/KS(Y−1) at respective different timings during the KS second-half output period of the first frame. Next, the SEG/KS control circuits 20-Y to 20-(N−1) of the SEG/KS control circuits 20-0 to 20-(N−1) output the first key scan pulse signals pls1 to the terminals SEG/KSY to SEG/KS(N−1) at respective different timings during the KS first-half output period of the second frame, and output the second key scan pulse signals pls2 to the terminals SEG/KSY to SEG/KS(N−1) at respective different timings during the KS second-half output period of the second frame.

Although the present invention has been described above in connection with several embodiments thereof, it would be apparent to those skilled in the art that those embodiments are provided solely for illustrating the present invention, and should not be relied upon to construe the appended claims in a limiting sense.

What is claimed is:

1. A liquid crystal display (LCD) controller comprising:
a plurality of segment/key source control circuits connected with an LCD panel and a key matrix through a plurality of segment/key source terminals, to periodically output a signal for one frame which contains a display output period and a key source output period,
wherein each of said plurality of segment/key source control circuits:
outputs a segment signal to a corresponding one of said plurality of segment/key source terminals during the display output period, wherein the segment signal has a display drive voltage indicating a maximum value, a minimum value, and intermediate values between the maximum value and the minimum value, and
outputs a first key scan pulse signal varying between the maximum value and the minimum value to a corresponding one of said plurality of segment/key source terminals during the key source output period in a key scan state when said key matrix has been operated, and then, outputs a second key scan pulse signal obtained by inverting the first key scan pulse signals to the corresponding segment/key source terminal.

2. The LCD controller according to claim 1, wherein the key source output period contains a first-half key source output period and a second-half key source output period, and
said plurality of segment/key source control circuits output first key scan pulse signals to said plurality of segment/key source terminals during the first-half key source output period in said key scan state, and output second key scan pulse signals to said plurality of segment/key source terminals during the second-half key source output period.

3. The LCD controller according to claim 2, wherein said plurality of segment/key source control circuits output first key-in wait signals indicating one of the maximum values and the minimum values to said plurality of segment/key source terminals during the first-half key source output period, and second key-in wait signals indicating the other of the maximum values and the minimum values to said plurality of segment/key source terminals during the second-half key source output period, in a key-in wait state that said key matrix is not operated.

4. The LCD controller according to claim 2, further comprising:
a plurality of COM control circuits connected with said LCD panel through a plurality of common terminals to periodically output a signal for one frame containing the display output period and the key source output period,
wherein said plurality of COM control circuits output to said plurality of common terminals during the display output period, common signals having display drive voltages indicating the maximum value, the minimum value and intermediate values between the maximum value and the minimum value,
the intermediate values contain a first intermediate value between the maximum value and the minimum value and a second intermediate value obtained by subtracting the first intermediate value from the maximum value, and
said plurality of COM control circuits output first non-display signals indicating one of the first intermediate value and the second intermediate value to said plurality of common terminals during the first-half key source output period, and output second non-display signals indicating the other of the first intermediate value and the second intermediate value to said plurality of common terminals during the second-half key source output period.

5. The LCD controller according to claim 1, wherein said plurality of segment/key source control circuits output first key scan pulse signals to said plurality of segment/key source terminals at different timings, and output second key scan pulse signals to said plurality of segment/key source terminals at different timings, during the key source output period in the key scan state.

6. The LCD controller according to claim 1, wherein said plurality of segment/source control circuits output first key scan pulse signals to said plurality of segment/key source terminals at different timings, and output the second key scan pulse signals to said plurality of segment/key source terminals at different timings, over plural periods during the key source output period in the key scan state.

7. A (liquid crystal display) LCD control method comprising:
- periodically outputting a signal for one frame which contains a display output period and a key source output period,
- wherein said outputting comprises:
  - carrying out a first output of segment signals to a plurality of segment/key source terminals during the display output period, wherein the segment signal has a display drive voltage indicating a maximum value, a minimum value, and intermediate values between the maximum value and the minimum value, and
  - carrying out a second output of first key scan pulse signals varying between the maximum value and the minimum value to said plurality of segment/key source terminals, and then, second key scan pulse signals obtained by inverting the first key scan pulse signals to said plurality of segment/key source terminals, during the key source output period in a key scan state when a key matrix has been operated.

8. The LCD control method according to claim 7, wherein the key source output period contains a first-half key source output period and a second-half key source output period, and
said carrying out a second output comprises:
- outputting first key scan pulse signals to said plurality of segment/key source terminals during the first-half key source output period, and second key scan pulse signals to said plurality of segment/key source terminals during the second-half key source output period, in said key scan state.

9. The LCD control method according to claim 8, wherein said carrying out a second output further comprises:
- outputting first key-in wait signals indicating one of the maximum values and the minimum values to said plurality of segment/key source terminals during the first-half key source output period, and second key-in wait signals indicating the other of the maximum values and the minimum values to said plurality of segment/key source terminals during the second-half key source output period, in a key-in wait state that said key matrix is not operated.

10. The LCD control method according to claim 8, wherein said outputting further comprises:
- carrying out a third output to a plurality of common terminals during the display output period, of common signals having display drive voltages indicating the maximum value, the minimum value and intermediate values between the maximum value and the minimum value,
- the intermediate values contain a first intermediate value between the maximum value and the minimum value and a second intermediate value obtained by subtracting the first intermediate value from the maximum value, and said carrying out a third output comprises:
- outputting first non-display signals indicating one of the first intermediate value and the second intermediate value to said plurality of common terminals during the first-half key source output period; and
- outputting second non-display signals indicating the other of the first intermediate value and the second intermediate value to said plurality of common terminals during the second-half key source output period.

11. The LCD control method according to claim 7, wherein said carrying out a second output comprises:
- outputting first key scan pulse signals to said plurality of segment/key source terminals at different timings, and second key scan pulse signals to said plurality of segment/key source terminals at different timings, during the key source output period in the key scan state.

12. The LCD control method according to claim 7, wherein said carrying out a second output comprises:
- outputting first key scan pulse signals to said plurality of segment/key source terminals at different timings, and the second key scan pulse signals to said plurality of segment/key source terminals at different timings, over plural periods during the key source output period in the key scan state.

* * * * *